US012797739B2

(12) United States Patent
Hu et al.

(10) Patent No.: US 12,797,739 B2
(45) **Date of Patent: *Nov. 17, 2026**

(54) VIRTUAL OBJECT CONTROL METHOD AND APPARATUS, COMPUTER DEVICE, AND STORAGE MEDIUM

(71) Applicant: TENCENT TECHNOLOGY (SHENZHEN) COMPANY LTD, Shenzhen (CN)

(72) Inventors: Xun Hu, Shenzhen (CN); Yu Lin Wan, Shenzhen (CN); Jianmiao Weng, Shenzhen (CN); Shan Dong Su, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 253 days.

This patent is subject to a terminal disclaimer.

(21) Appl. No.: 18/733,985

(22) Filed: Jun. 5, 2024

(65) Prior Publication Data

US 2024/0325910 A1 Oct. 3, 2024

Related U.S. Application Data

(63) Continuation of application No. 17/507,965, filed on Oct. 22, 2021, now Pat. No. 12,005,360, which is a (Continued)

(30) Foreign Application Priority Data

Jun. 5, 2020 (CN) ......................... 202010507467.0

(51) Int. Cl.
*A63F 13/56* (2014.01)
*A63F 13/2145* (2014.01)
*G06F 3/04886* (2022.01)

(52) U.S. Cl.
CPC .......... *A63F 13/56* (2014.09); *A63F 13/2145* (2014.09); *G06F 3/04886* (2013.01); *G06F 2203/04808* (2013.01)

(58) Field of Classification Search
CPC ........ A63F 13/537; A63F 13/52; A63F 13/56; A63F 13/2145
See application file for complete search history.

(56) References Cited

U.S. PATENT DOCUMENTS 5,044,956 A * 9/1991 Behensky ............... A63F 13/57 434/45
8,210,943 B1 * 7/2012 Woodard ................ A63F 13/69 463/2

(Continued)

FOREIGN PATENT DOCUMENTS

CN 108771863 A 11/2018
CN 108837506 A 11/2018

(Continued)

OTHER PUBLICATIONS

Translation of International Search Report dated Aug. 11, 2021 in application No. PCT/CN2021/093061.

(Continued)

*Primary Examiner* — Steve Rowland
(74) *Attorney, Agent, or Firm* — Sughrue Mion, PLLC

(57) ABSTRACT

Embodiments of the disclosure disclose a virtual object control method and apparatus, a computer device, and a storage medium. At least two touch positions through which a touch operation passes are determined, and a target touch position determined according to the at least two touch positions is comprehensively considered, thereby avoiding a case in which an aiming direction is determined based on an inaccurate last touch position generated due to an erroneous operation of a user.

18 Claims, 14 Drawing Sheets

Related U.S. Application Data continuation of application No. PCT/CN2021/093061, filed on May 11, 2021.

(56) References Cited

U.S. PATENT DOCUMENTS

| | | | | |
|---|---|---|---|---|
| 10,702,775 | B2 * | 7/2020 | Rong | G06F 3/0481 |
| 2001/0045941 | A1 * | 11/2001 | Rosenberg | A63F 13/23 345/161 |
| 2002/0103031 | A1 * | 8/2002 | Neveu | A63F 13/537 463/49 |
| 2004/0043805 | A1 * | 3/2004 | Sonoda | A63F 13/45 463/1 |
| 2004/0157662 | A1 * | 8/2004 | Tsuchiya | A63F 13/5378 463/32 |
| 2004/0176163 | A1 * | 9/2004 | Ishihata | A63F 13/52 463/30 |
| 2006/0084509 | A1 * | 4/2006 | Novak | A63F 13/30 463/30 |
| 2006/0287027 | A1 * | 12/2006 | Hardisty | A63F 13/45 463/8 |
| 2007/0270215 | A1 * | 11/2007 | Miyamoto | A63F 13/45 463/32 |
| 2008/0214304 | A1 * | 9/2008 | Castle | A63F 13/10 463/36 |
| 2009/0143141 | A1 * | 6/2009 | Wells | G07F 17/3239 463/37 |
| 2009/0181736 | A1 * | 7/2009 | Haigh-Hutchinson | A63F 13/55 463/2 |
| 2009/0325660 | A1 * | 12/2009 | Langridge | A63F 13/45 463/2 |
| 2010/0311503 | A1 * | 12/2010 | McMain | A63F 13/58 463/40 |
| 2011/0172013 | A1 | 7/2011 | Shirasaka et al. | |
| 2011/0256930 | A1 * | 10/2011 | Jaouen | A63F 13/803 463/37 |
| 2012/0322523 | A1 * | 12/2012 | Woodard | A63F 13/69 463/2 |
| 2013/0196767 | A1 * | 8/2013 | Garvin | A63F 13/422 463/36 |
| 2015/0157932 | A1 * | 6/2015 | Kwon | G06Q 50/00 463/31 |
| 2015/0157940 | A1 * | 6/2015 | Hall | A63F 13/5372 463/31 |
| 2015/0258439 | A1 * | 9/2015 | Prosin | A63F 13/00 463/31 |
| 2016/0129345 | A1 * | 5/2016 | Seok | A63F 13/213 463/31 |
| 2017/0361230 | A1 * | 12/2017 | Tang | A63F 13/422 |
| 2018/0113591 | A1 | 4/2018 | Chen et al. | |
| 2018/0147488 | A1 * | 5/2018 | Tang | A63F 13/2145 |
| 2018/0157398 | A1 | 6/2018 | Kaehler et al. | |
| 2018/0369693 | A1 * | 12/2018 | Rong | A63F 13/92 |
| 2019/0265882 | A1 | 8/2019 | Nakahara | |
| 2019/0391676 | A1 * | 12/2019 | Wang | G06F 3/04886 |
| 2020/0298104 | A1 * | 9/2020 | Wang | A63F 13/422 |
| 2020/0298116 | A1 * | 9/2020 | Wang | A63F 13/537 |
| 2020/0368616 | A1 * | 11/2020 | Delamont | A63F 13/52 |
| 2020/0402349 | A1 * | 12/2020 | Karrbrink | G07F 17/3258 |
| 2021/0101074 | A1 * | 4/2021 | Hemby | G09G 5/377 |
| 2021/0245061 | A1 * | 8/2021 | Kaushik | A63F 13/798 |
| 2022/0047941 | A1 * | 2/2022 | Chen | A63F 13/2145 |
| 2023/0350554 | A1 * | 11/2023 | Xiao | G06F 3/04845 |
| 2026/0000985 | A1 * | 1/2026 | Zhang | A63F 13/55 |

FOREIGN PATENT DOCUMENTS

| | | | |
|---|---|---|---|
| CN | 109224439 | A | 1/2019 |
| CN | 110613933 | A | 12/2019 |
| CN | 110652725 | A | 1/2020 |
| CN | 110665222 | A | 1/2020 |
| CN | 111151002 | A | 5/2020 |
| CN | 111672115 | A | 9/2020 |
| EP | 2343638 | A2 | 7/2011 |
| EP | 3278850 | A1 | 2/2018 |
| JP | 2011-141632 | A | 7/2011 |
| JP | 2018-517533 | A | 7/2018 |
| JP | 2020-39403 | A | 3/2020 |
| KR | 10-2019-0094381 | A | 8/2019 |

OTHER PUBLICATIONS

Office Action dated Dec. 5, 2022 from the Japanese Patent Office in JP Application No. 2021-563357.

Translation of Written Opinion dated Aug. 11, 2021 in application No. PCT/CN2021/093061.

Communication dated Feb. 2, 2023, from the Intellectual Property Office of Singapore in Application No. 11202111306X.

International Search Report for PCT/CN2021/093061 dated Aug. 11, 2021.

Search Report dated Jan. 2, 2023 issued by the Intellectual Property Office of Singapore in application No. 11202111306X.

Written Opinion for PCT/CN2021/093061 dated Aug. 11, 2021.

Written Opinion dated Feb. 2, 2023 issued by the Intellectual Property Office of Singapore in application No. 11202111306X.

Korean Office Action issued Aug. 29, 2023 in Application No. 10-2021-7034213.

Chinese Office Action for Chinese Application No. 202010507467.0 dated May 26, 2021.

Travis Boylls, How to Play Angry Birds, 2017, Wikihow, p. 1, at https://www.wikihow.com/Play-Angry-Birds (last visited Nov. 14, 2023). (Year: 2017).

* cited by examiner

VIRTUAL OBJECT CONTROL METHOD AND APPARATUS, COMPUTER DEVICE, AND STORAGE MEDIUM

CROSS-REFERENCE TO RELATED APPLICATION(S)

This application is a Continuation Application of U.S. application Ser. No. 17/507,965, filed Oct. 22, 2021, which is a continuation application of International Application No. PCT/CN2021/093061, filed May 11, 2021, which claims priority to Chinese Patent Application No. 202010507467.0, filed with the China National Intellectual Property Administration on Jun. 5, 2020, the disclosures of which are incorporated by reference in their entireties.

FIELD

Embodiments of the disclosure relate to the field of computer technologies, and in particular, to a virtual object control method and apparatus, a computer device, and a storage medium.

BACKGROUND

With the development of computer technologies and the widespread popularization of electronic games, a virtual object may be controlled to perform various operations in the electronic game, thereby greatly improving the game effect. A skill casting operation is a common operation. A user may control, according to an aiming direction, the virtual object to cast a skill, but needs to determine the aiming direction before casting the skill.

The user generally performs a touch operation in a touch region by using a finger, to determine the aiming direction according to a touch position of the touch operation. However, because the finger has a relatively large contact area with the touch region, and it is difficult to control the touch position, the actual touch position is very likely to be inconsistent with a touch position intended by the user, resulting in an inaccurate aiming direction.

SUMMARY

Embodiments of the disclosure provide a virtual object control method and apparatus, a computer device and a storage medium, to improve the accuracy in performing an operation in an application (e.g., determining an aiming direction of an operation).

According to an aspect of an example embodiment, a virtual object control method in an application is provided, including:

- determining, in response to a touch operation on a touch region, at least two touch positions through which the touch operation passes, the at least two touch positions being selected from a preset quantity of touch positions through which the touch operation lastly passes;
- combining the at least two touch positions according to a preset policy, and determining a target touch position of the touch operation;
- determining a first aiming direction indicated by the target touch position; and
- controlling, according to the first aiming direction, a first virtual object to perform a skill casting operation.

According to an aspect of an example embodiment, a virtual object control apparatus in an application is provided, including at least one memory configured to store program code; and at least one processor configured to read the program code and operate as instructed by the program code, the program code including:

- touch position determining code configured to cause the at least one processor to determine, in response to a touch operation on a touch region, at least two touch positions through which the touch operation passes, the at least two touch positions being selected from a preset quantity of touch positions through which the touch operation lastly passes;
- target position determining code configured to cause the at least one processor to combine the at least two touch positions according to a preset policy, and determine a target touch position of the touch operation;
- first direction determining code configured to cause the at least one processor to determine a first aiming direction indicated by the target touch position; and
- first control code configured to cause the at least one processor to control, according to the first aiming direction, a first virtual object to perform a skill casting operation.

According to an aspect of an example embodiment, a computer device is provided, including a processor and a memory, the memory storing at least one instruction, the at least one instruction being loaded and executed by the processor to implement the operations performed in the virtual object control method.

According to an aspect of an example embodiment, provided is a non-transitory computer-readable storage medium, storing at least one instruction executable by at least one processor to implement the operations performed in the virtual object control method.

BRIEF DESCRIPTION OF THE DRAWINGS

To describe the technical solutions in the example embodiments of the disclosure more clearly, the following briefly introduces the accompanying drawings required for describing the embodiments. The accompanying drawings in the following description show only some of the embodiments of the disclosure, and a person of ordinary skill in the art may still derive other accompanying drawings from the accompanying drawings without creative efforts.

DETAILED DESCRIPTION

To make objectives, technical solutions, and advantages of the example embodiments of the disclosure clearer, the following further describes implementations of the disclosure in detail with reference to the accompanying drawings.

It may be understood that, the terms "first", "second", and the like used in the disclosure may be used for describing various concepts in this specification. However, the concepts are not limited by the terms unless otherwise specified. The terms are merely used for distinguishing one concept from another concept. For example, without departing from the scope of the disclosure, a first virtual object may be referred to as a second virtual object, and the second virtual object may be referred to as the first virtual object.

For case of understanding of the embodiments of the disclosure, nouns related in the embodiments of the disclosure are explained.

A multiplayer online battle arena (MOBA) is an arena in which at least two opposing camps occupy respective map regions in a virtual scene, and compete against each other using a specific victory condition as an objective. The victory conditions include, but not limited to, at least one of occupying forts or destroy forts of an opposing camp, killing virtual objects in the opposing camp, ensuring own survivals in a specified scenario and time, seizing a specific resource, and outscoring an opponent within a specified time. The battle arena may take place in rounds, and each round of the battle arena may have the same map or different maps. Each virtual team includes one or more virtual objects, for example, 1 virtual object, 2 virtual objects, 3 virtual objects, or 5 virtual objects, or any other number of virtual objects.

Figure 1A:
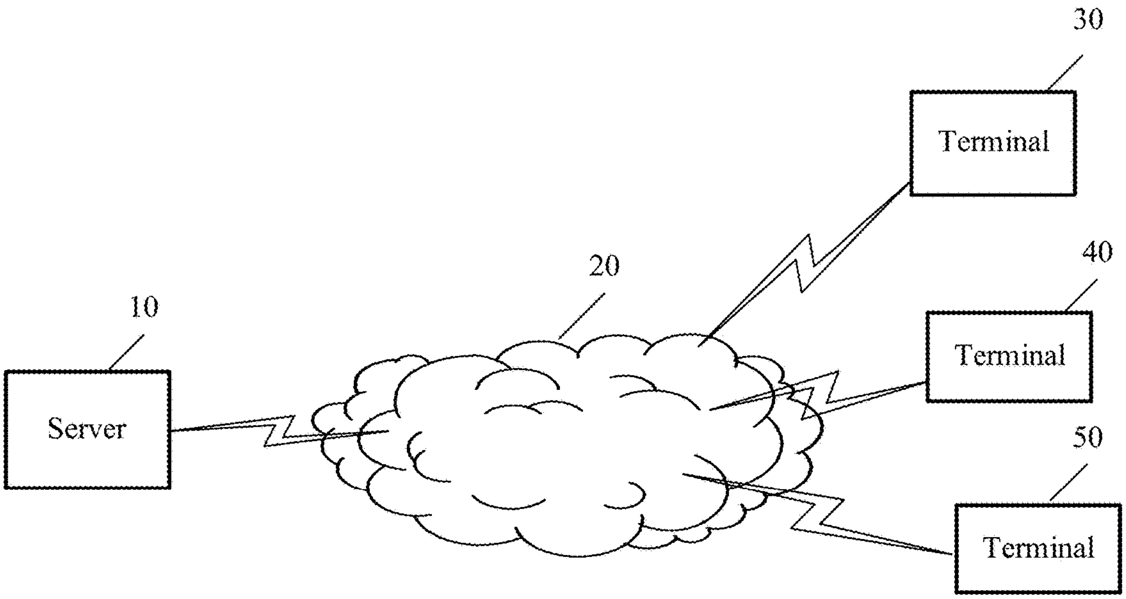
FIG. 1A is an architectural diagram of an applicable implementation environment according to an embodiment of the disclosure.

MOBA game: a game in which, for example, a plurality of forts are provided in a virtual scene, and users in different camps control virtual objects to battle in the virtual scene, occupy forts or destroy forts of an opposing camp. For example, in the MOBA game, virtual objects of a plurality of users may be divided into two opposing camps. The virtual objects are scattered in the virtual scene to compete against each other, and the victory condition is to destroy or occupy all enemy forts. The MOBA game takes place in rounds, and a duration of one round of the MOBA game is from a moment at which the game starts to a movement at which a specific camp meets the victory condition. FIG. 1A is an architectural diagram of an applicable implementation environment according to an embodiment of the disclosure. As shown in FIG. 1A, the implementation environment may include a server 10 and a plurality of terminals such as terminals 30, 40, and 50, that communicate with each other through a network 20. The server 10 may be a game server that provides online game services. The terminals 30, 40, and 50 may be computing devices capable of running online games, such as a smartphone, a person computer (PC), a tablet computer, and a game console. Users of a plurality of terminals may access, through the network 20, a same round of online game provided by the server 10 to fight an online battle.

Virtual object: a movable object in a virtual scene. The movable object may be in any form, for example, is a virtual character, a virtual animal, or a cartoon character. When the virtual scene is a three-dimensional (3D) virtual scene, the virtual objects may be 3D models. Each virtual object has a shape and a volume in the 3D virtual scene, and occupies a part of space in the 3D virtual scene. The virtual object is a 3D character constructed based on a 3D human skeleton technology. The virtual object wears different skins to implement different appearances. In some implementations, the virtual object may be alternatively implemented by using a 2.5-dimensional model or a two-dimensional (2D) model. This is not limited in this embodiment of the disclosure.

Virtual scene: It is a virtual scene displayed (or provided) by an application program when run on a terminal. The virtual scene may be used for simulating a 3D virtual space, and the 3D virtual space may be an open space. The virtual scene may be a virtual scene that simulates a real environment in reality, or may be a semi-simulated semi-fictional virtual scene, or may be an entirely fictional virtual scene. The virtual scene may be any one of a 2D virtual scene, a 2.5-dimensional virtual scene, and a 3D virtual scene. For example, the virtual scene may include a river, underbrush, land, a building, and the like. The virtual scene is used for a battle between at least two virtual objects, and the virtual scene further includes virtual resources used for the at least two virtual objects. For example, the virtual resources are used for arming the virtual object or are props such as a weapon required to fight a battle with other virtual objects.

For example, the virtual scene may be a virtual scene in any electronic game. Using the electronic game is a MOBA as an example, the virtual scene is provided with a square map. The square map includes a lower left corner region and an upper right corner region that are symmetrical. Virtual objects belonging to two opposing camps occupy the regions respectively, and an objective of each side is to destroy a target building in an opponent's region to win a game victory.

The virtual object control method provided in the embodiments of the disclosure is applicable to a plurality of scenarios, for example, is applicable to a battle scene in a game. In the battle scene, the terminal displays a first virtual object, the user controls the first virtual object to perform a skill casting operation, and by using the virtual object control method provided in the embodiments of the disclosure, may determine an aiming direction when the first virtual object performs the skill casting operation.

Figure 1B:
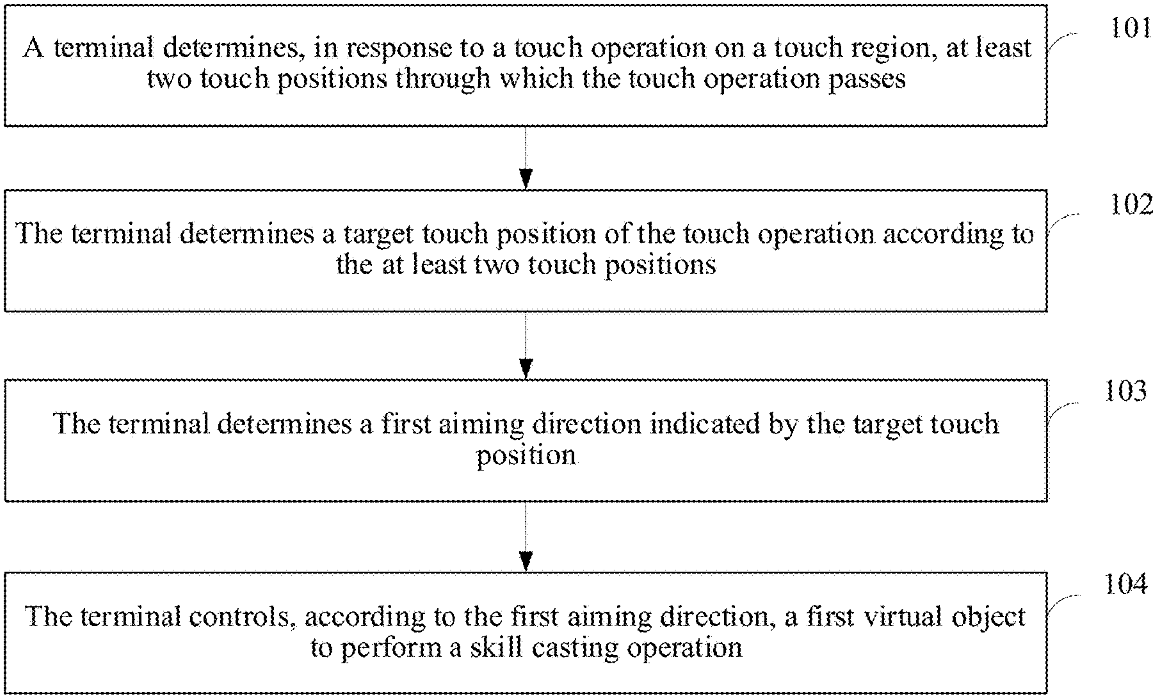
FIG. 1B is a flowchart of a virtual object control method according to an embodiment of the disclosure.

FIG. 1B is a flowchart of a virtual object control method according to an embodiment of the disclosure. This embodiment of the disclosure is executed by a terminal, and the terminal may be a portable terminal, a pocket-sized terminal, a handheld terminal, or another type of terminal such as a mobile phone, a computer, or a tablet computer. Referring to FIG. 1B, the method includes the following operations 101-104:

101. A terminal determines, in response to a touch operation on a touch region, at least two touch positions through which the touch operation passes, the at least two touch positions being selected from a preset quantity of touch positions through which the touch operation lastly (or finally) passes before the touch operation is ended.

In this embodiment of the disclosure, the terminal displays a virtual scene interface. The virtual scene interface includes a virtual scene. The virtual scene may include a first virtual object, or may include a river, underbrush, land, a building, a virtual resource used by a virtual object, and the like. In addition, the virtual scene interface may further include a touch button, a touch region, and the like, so that the user may control, by using the touch button or the touch region, the first virtual object to perform operations. For example, the virtual object may be controlled to perform operations such as adjusting a posture, crawling, walking, running, riding, flying, jumping, driving, and picking, or the virtual object may be controlled to perform a skill casting operation or other operations.

The first virtual object is a virtual object controlled by the user. The virtual scene may further include other virtual objects than the first virtual object, and the other virtual objects may be virtual objects controlled by other users, or may be virtual objects automatically controlled by the terminal, such as a monster, a soldier, and a neutral creature in the virtual scene.

When performing a skill casting operation, the first virtual object needs to cast a skill on another virtual object, or to cast a skill on a specific direction, or to cast a skill on a specific position. However, regardless of a case, an aiming direction needs to be first determined when a skill is cast.

In this embodiment of the disclosure, the touch region is used for triggering the skill casting operation, and has a function of adjusting the aiming direction. A finger of the user touches the touch region, and performs the touch operation in the touch region, thereby generating touch positions. The touch positions indicate the aiming direction when the skill is cast. The user may select an intended aiming direction by moving the finger in the touch region. Once the finger of the user performs a lifting action, the terminal may determine an aiming direction according to a touch position when the finger is lifted, and control, according to the aiming direction, the first virtual object to perform the skill casting operation.

In the related art, the finger of the user touches the touch region, the finger moves in the touch region, and the user then lifts the finger. In this process, the terminal determines at least two touch positions, and controls, according to an aiming direction indicated by a last touch position, the first virtual object to perform the skill casting operation. However, in an actual application, when the user lifts the finger, the finger may move slightly, resulting in a displacement of the touch position, and a new touch position is generated after the touch position intended by the user, resulting in a case that the aiming direction indicated by the actual last touch position is not the aiming direction intended by the user. In this embodiment of the disclosure, to improve the accuracy of the aiming direction and meet a requirement of the user, at least two touch positions through which the touch operation passes may be determined, and the touch positions are comprehensively considered subsequently to determine a more accurate aiming direction.

102. The terminal combines the at least two touch positions according to a preset policy, and determines a target touch position of the touch operation.

103. The terminal determines a first aiming direction indicated by the target touch position.

In this embodiment of the disclosure, the terminal determines a target touch position according to the at least two touch positions, and uses an aiming direction indicated by the target touch position as a first aiming direction. Because the at least two touch positions are likely to include the touch position intended by the user, compared with the last touch position, the target touch position may better reflect the requirement of the user, thereby improving the accuracy of the aiming direction.

The target touch position is used for indicating the first aiming direction of the first virtual object. The first aiming direction may be any direction in the virtual scene. For example, using the first virtual object as an origin, the first aiming direction may be the left, upper right, lower right, or the like of the first virtual object, or may be represented in a more precise manner. The first aiming direction may be a 30-degree direction, a 90-degree direction, or the like, relative to the first virtual object.

104. The terminal controls, according to the first aiming direction, a first virtual object to perform a skill casting operation.

After determining the first aiming direction, the terminal controls the first virtual object to perform the skill casting operation on the first aiming direction.

The first virtual object may have different types of skills, for example, may include a direction-type skill, an object-type skill, and a position-type skill. For different types of skills, when the first virtual object is controlled to perform the skill casting operation, for different objects, for example, in the object-type skill, the first virtual object is controlled to perform the skill casting operation on a virtual object in the aiming direction in the virtual scene; in the position-type skill, the first virtual object is controlled to perform the skill casting operation on a specific position in the aiming direction in the virtual scene; and in the direction-type skill, the first virtual object is controlled to perform the skill casting operation on the aiming direction in the virtual scene.

In the method provided in the embodiments of the disclosure, an aiming direction is no longer determined according to only a last touch position of a touch operation in a touch region, but at least two touch positions through which the touch operation passes are determined, and a target touch position determined according to the at least two touch positions is comprehensively considered, thereby avoiding a case in which an aiming direction is determined based on the last touch position generated due to a misoperation of a user, which is inconsistent with a touch position intended by the user. According to an example embodiment, the obtained target touch position reflects the touch position intended by the user, and thus, an aiming direction indicated by the target touch position better meets the intention of the user, thereby improving the accuracy of the aiming direction. Subsequently, a first virtual object is controlled, according to the determined aiming direction, to perform a skill casting operation, so that more accurate control of the skill casting operation of the first virtual object is also achieved.

Figure 2:
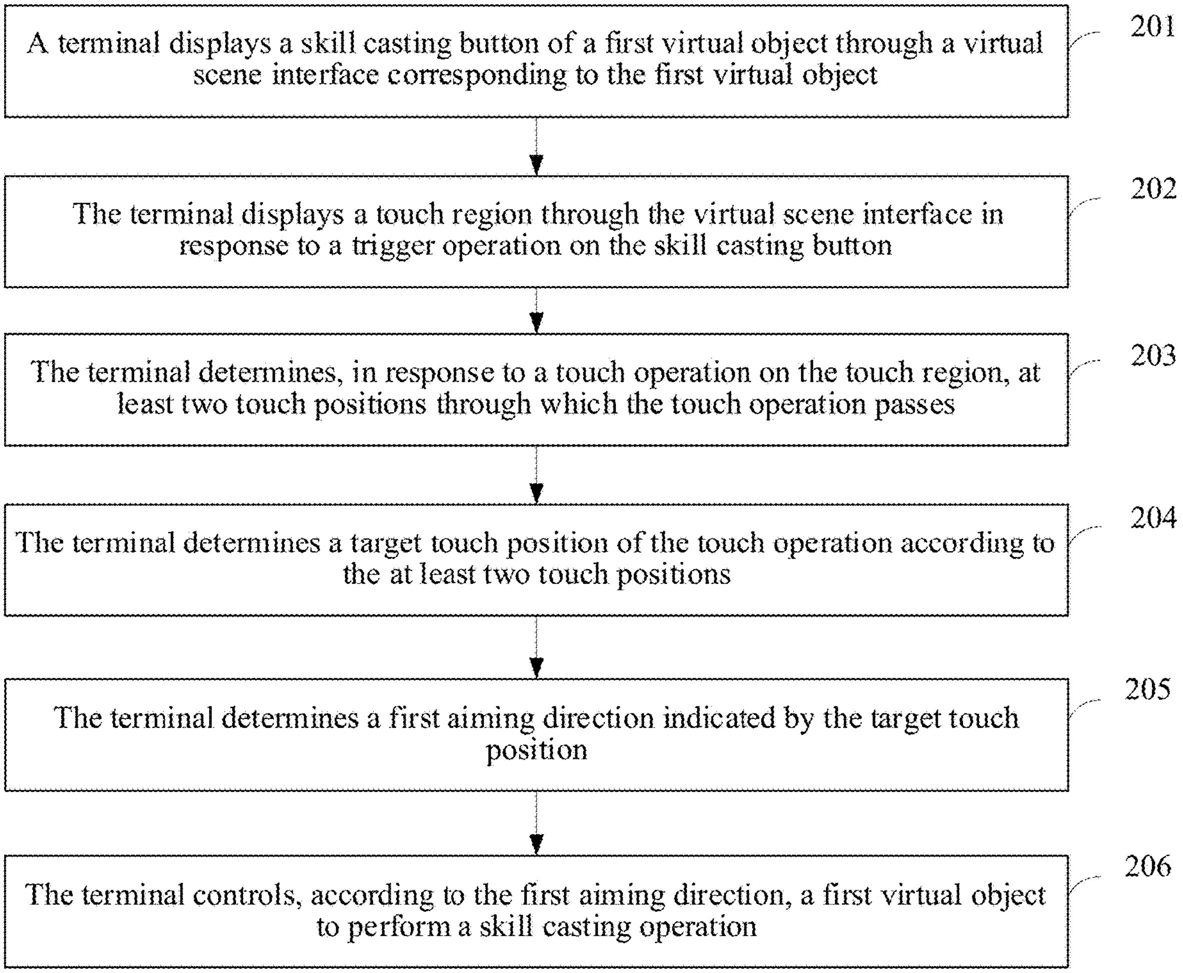
FIG. 2 is a flowchart of another virtual object control method according to an embodiment of the disclosure.

FIG. 2 is a flowchart of another virtual object control method according to an embodiment of the disclosure. Referring to FIG. 2, this embodiment is executed by a terminal. Referring to FIG. 2, the method includes the following operations 201-206:

201. A terminal displays a skill casting button of a first virtual object through a virtual scene interface corresponding to the first virtual object.

In this embodiment of the disclosure, the virtual scene interface is used for displaying a virtual scene within a field of view of a first virtual object. The virtual scene interface may include a skill casting button of the first virtual object, or may include the first virtual object and other virtual objects, or may include a river, underbrush, land, a building, a virtual resource used by a virtual object, and the like.

The virtual objects may be divided into a plurality of types of virtual objects. For example, the virtual objects may be divided into a plurality of types according to shapes of the virtual objects or skills of the virtual objects or according to other division standards. For example, if the virtual objects are divided into the plurality of types according to the skills of the virtual objects, the virtual objects may include a fighter-type virtual object, a mage-type virtual object, a support-type virtual object, an archer-type virtual object, and an assassin-type virtual object. In this embodiment of the disclosure, the first virtual object may be any type of a virtual object.

The first virtual object may have one or more skill casting buttons, and different skill casting buttons correspond to different skills. In an example embodiment, the skill casting button includes a text or an image, and the text or the image is used for describing a skill corresponding to the skill casting button. The embodiment of the disclosure is described by using any skill casting button of the first virtual object as an example, however, the embodiment is not limited.

Figure 3:
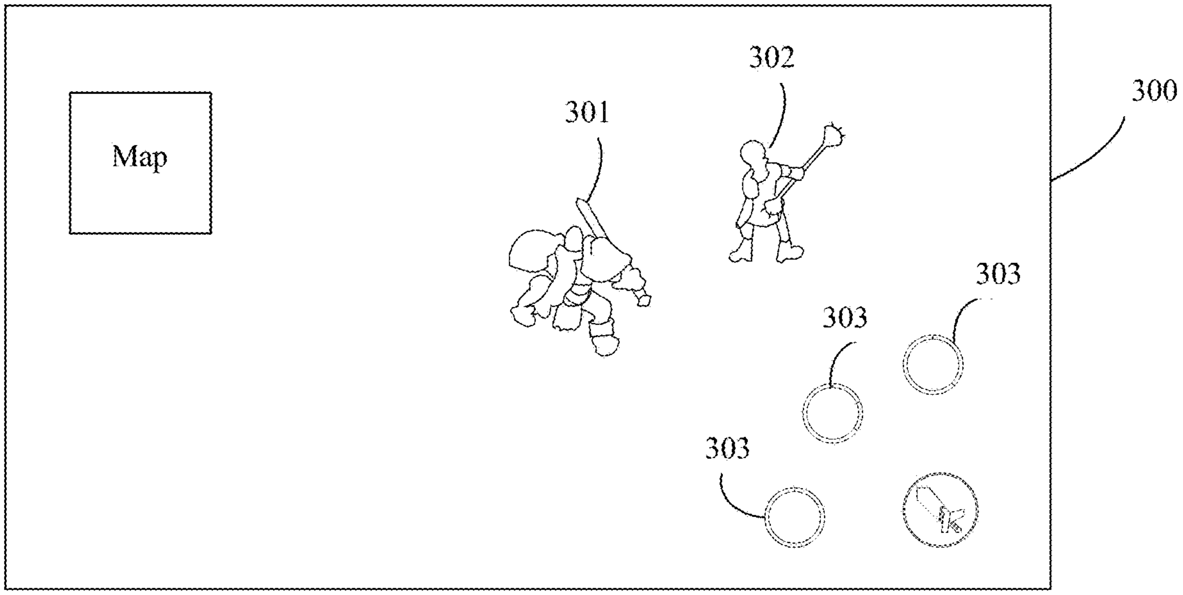
FIG. 3 is a schematic diagram of a virtual scene interface according to an embodiment of the disclosure.

For example, referring to a virtual scene interface 300 shown in FIG. 3, the virtual scene interface 300 includes a first virtual object 301 and a second virtual object 302, the first virtual object 301 and the second virtual object 302 belonging to different camps. The virtual scene interface 300 further includes a plurality of skill casting buttons 303, the plurality of skill casting buttons 303 being located at a lower right corner of the virtual scene interface. In addition, an upper left corner of the virtual scene interface displays a complete virtual scene map.

202. The terminal displays a touch region through the virtual scene interface in response to a trigger operation on the skill casting button.

The terminal displays a skill casting button of the first virtual object through the virtual scene interface, the user performs a trigger operation on the skill casting button, and the terminal detects the trigger operation performed by the user on the skill casting button, and displays a touch region corresponding to the skill casting button through the virtual scene interface. The trigger operation may be a click operation, a sliding operation, or another operation of any type.

If the first virtual object has the plurality of skill casting buttons, and the user performs a trigger operation on any skill casting button, the terminal displays a touch region corresponding to the skill casting button through the virtual scene interface.

The touch region may be in a circle, square, or any other shape. The touch region may be located at any position of the virtual scene, for example, at a lower right corner or a lower left corner of the virtual scene.

In an example embodiment, the touch region includes a first touch subregion and a second touch subregion, the second touch subregion being outside the first touch subregion. The finger of the user touches the touch region. If the user lifts the finger at an end touch position, which is within the first touch subregion, the terminal controls the first virtual object to quickly cast a skill; and if the user lifts the finger at the end touch position, and the end touch position is within the second touch subregion, the terminal controls the first virtual object to actively perform aiming to obtain an aiming direction.

Figure 4:
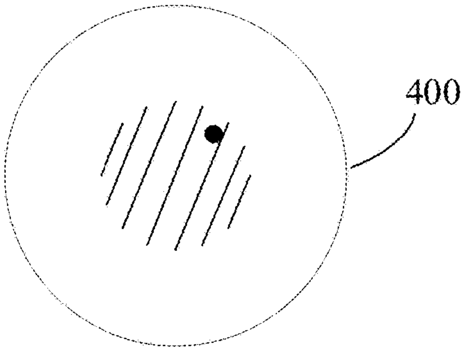
FIG. 4 is a schematic diagram of a touch region according to an embodiment of the disclosure.

For example, referring to a touch region 400 shown in FIG. 4, the touch region 400 is a circular region, a shaded part is a first touch subregion, a blank part is a second touch subregion, and a dot represents a touch position when the finger presses.

203. The terminal determines, in response to a touch operation on the touch region, at least two touch positions through which the touch operation passes.

The terminal displays the touch region, the finger of the user touches the touch region, the terminal detects a touch point corresponding to the finger of the user, the finger of the user moves in the touch region, and a position of the touch point also changes accordingly until the finger of the user is lifted. The touch operation on the touch region is completed, and the terminal may determine, by detecting the touch operation, at least two touch positions through which the touch operation passes.

In an example embodiment, when the finger of the user is lifted, if an end touch position of the touch point falls within the second touch subregion, the terminal determines a target touch position of the touch operation according to the at least two touch positions. That is, if the end touch position falls within the second touch subregion, it is considered that the user intends to control, according to the operation of the user, the first virtual object to determine an aiming direction.

In an example embodiment, when the end touch position falls within the second touch subregion, the target touch position determined by the terminal may fall within the second touch subregion, or may fall within the first touch subregion. If the target touch position falls within the second touch subregion, the following operation 204 is performed; and if the target touch position falls within the first touch subregion, the terminal controls the first virtual object to quickly cast the skill.

In an example embodiment, the touch operations include a press operation at a first touch point, a sliding operation from the first touch point, and a lifting operation at a second touch point. When the finger of the user is in contact with the touch region, the finger of the user is recognized as the touch point. The terminal determines, in response to the press operation corresponding to the touch point in the touch region, an initial touch position corresponding to the press operation; determines at least one intermediate touch position during sliding from the touch point in the touch region; determines, in response to the lifting operation corresponding to another touch point in the touch region, an end touch position corresponding to the lifting operation; and determines the preset quantity of touch positions from the at least one intermediate touch position and the end touch position. When the terminal detects the press operation of the touch point in the touch region, it indicates that it is ready to perform the skill casting operation. The process of sliding the touch point is an adjustment of the aiming direction. When the terminal detects the lifting operation of the touch point, it indicates that the adjustment of the aiming direction has been completed.

In an example embodiment, the terminal determines, in response to the press operation of the touch point in the touch region, whether the touch point falls within the touch region. If yes, the terminal determines the initial touch position corresponding to the press operation; and if not, the terminal does not perform the skill casting operation.

In an example embodiment, to avoid conflicts between touch operations of a plurality of fingers of the user, the terminal assigns a touch identifier to the touch point in response to the press operation corresponding to the touch point in the touch region. Subsequently, a position of the touch point in the touch region may change. If the terminal may detect a touch position and a touch identifier corresponding to the touch position, the terminal determines at least two touch positions that are detected in the touch region and match the touch identifier, to ensure that the determined at least two touch positions belong to the same finger of the user, that is, belong to the same touch operation. The touch point is a position point generated because the finger of the user is in contact with a display screen. The touch identifier may be fingerID or another type of identifier.

During the touch operation, the position of the touch point when the finger of the user presses is the initial touch position. During sliding from the touch point in the touch region, the touch identifier of the touch point does not change, but the touch position may change, and further more touch positions may be generated. In addition, the touch position generated by the finger of the user matches the touch identifier of the touch point, a position of the touch point when the finger of the user is lifted is the end touch position, and the end touch position is a last touch position during the touch operation.

In an example embodiment, for all the touch positions through which the touch operation passes, because several initial touch positions have a little impact on the aiming direction when the aiming direction is determined, several last touch positions have a great impact on the aiming direction. Therefore, the determined at least two touch positions through which the touch operation passes may include the end touch position of the touch operation and at least one touch position before the end touch position.

In an example embodiment, the process in which the user performs the touch operation on the touch region is a dynamic process. When the user performs the touch operation, the terminal acquires the virtual scene interface, to obtain at least two virtual scene interfaces arranged according to an arrangement order. If each virtual scene interface includes a touch position of a touch point, the at least two touch positions are also arranged according to an arrangement order. For example, if the at least two touch positions are arranged according to an arrangement order (e.g., an input order of a touch operation at the at least two positions) from the initial touch position to the end touch position, the terminal may select, from the at least two touch positions, a preset quantity of touch positions arranged at the end. For example, if two touch positions are selected, the end touch position and a previous touch position of the end touch position are selected. For example, if the at least two touch positions are arranged according to an arrangement order from the end touch position to the initial touch position, the terminal may select, from the at least two touch positions, a preset quantity of touch positions arranged at the top.

In an example embodiment, the virtual scene interface may be acquired according to a fixed time interval. Correspondingly, a time interval between any two adjacent touch positions in the determined at least two touch positions may be the same.

In an example embodiment, the touch position may be represented by coordinates, and each touch position has corresponding coordinates. By processing coordinates of the at least two touch positions, coordinates of the target touch position may be determined, thereby determining the target touch position. In an example embodiment, a coordinate system is established by using a center of the touch region as a coordinate origin, and each position in the touch region has corresponding coordinates.

In an example embodiment, the virtual scene interface may further include another touch region of the first virtual object. The another touch region is used for controlling actions of the first virtual object such as moving forward, reversing, and moving, and operations may be performed on both the touch region corresponding to the skill casting button and the another touch region, so that the first virtual object casts the skill while taking an action. The virtual scene interface may further include other touch regions. This is not limited in this embodiment of the disclosure.

Another implementation of operation 203 is similar to that of operation 101, and details are not described herein again.

204. The terminal determines a target touch position of the touch operation according to the at least two touch positions.

In an example embodiment, the touch position is represented by using the coordinates. The terminal determines weights of the at least two touch positions according to an arrangement order of the at least two touch positions; and performs weighted combination on coordinates of the at least two touch positions according to the weights of the at least two touch positions, to obtain coordinates of the target touch position. The weights of the at least two touch positions may be preset, and a sum of the weights of the at least two touch positions is 1. A quantity of at least two touch positions may alternatively be preset.

In an example embodiment, the coordinates of the touch position may include a horizontal coordinate and a vertical coordinate. The terminal performs weighted summation on horizontal coordinates of the at least two touch positions according to the weights of the at least two touch positions, to obtain a horizontal coordinate of the target touch position; and performs weighted summation on vertical coordinates of the at least two touch positions according to the weights of the at least two touch positions, to obtain a vertical coordinate of the target touch position.

For example, if the terminal needs to determine the target touch position according to three touch positions arranged at the end (e.g., touch positions corresponding to touch operations received at the end), the terminal presets weights q1, q2, and q3 of the three touch positions, where q1 is a weight of an end touch position, q2 is a weight of a penultimate touch position, and q3 is a weight of an antepenultimate touch position. If coordinates of the end touch position are $(x_1, y_1)$, coordinates of the penultimate touch position are $(x_2, y_2)$, and coordinates of the antepenultimate touch position are $(x_3, y_3)$, a horizontal coordinate of the target touch position is: $x=x_1*q1+x_2*q2+x_3*q3$, and a vertical coordinate of the target touch position is: $y=y_1*q1+y_2*q2+y_3*q3$, to obtain coordinates of the target touch position (x, y).

In an example embodiment, if the at least two touch positions include the end touch position and the previous touch position of the end touch position, a weight of the end touch position may be set to 0, and a weight of the previous touch position of the end touch position may be set to 1. The finger of the user presses the touch region. Because the finger of the user has a relatively large contact area with the touch region, when the user lifts the finger, the touch position of the touch point generates a displacement, and a new touch position is generated after the touch position intended by the user. That is, the end touch position is likely to be a touch position generated due to a misoperation of the user, and the previous touch position of the end touch position is likely to be a touch position used by the user to determine the aiming direction. Therefore, the previous touch position of the end touch position is determined as the target touch position.

Another implementation of operation 204 is similar to that of operation 102, and details are not described herein again.

205. The terminal determines a first aiming direction indicated by the target touch position.

In an example embodiment, a center point of the touch region is used as an origin, a direction in which the target touch position is located at the center point is determined according to the coordinates of the target touch position, and the direction is used as a first aiming direction. Correspondingly, for the first virtual object in the virtual scene interface, the first aiming direction is an aiming direction of the first virtual object. Subsequently, when performing the skill casting operation, the first virtual object casts the skill on the first aiming direction of the first virtual object by using the first virtual object as an origin.

Another implementation of operation 205 is similar to that of operation 103, and details are not described herein again.

206. The terminal controls, according to the first aiming direction, a first virtual object to perform a skill casting operation.

After determining the first aiming direction, the terminal controls the first virtual object to perform the skill casting operation on the first aiming direction.

In an example embodiment, the terminal determines an aiming position in the first aiming direction according to the first aiming direction and a first preset distance; and controls the first virtual object to perform the skill casting operation on the aiming position. A distance between the aiming position and the first virtual object is the first preset distance, the first preset distance being a skill casting distance set by using the first virtual object as the origin.

In another example embodiment, the terminal determines a second virtual object that has a shortest distance from the first virtual object in the first aiming direction; and controls the first virtual object to perform the skill casting operation on the second virtual object. After determining the first aiming direction, the terminal may automatically obtain the virtual object in the first aiming direction, and select, according to a position of the obtained virtual object, a virtual object that has a shortest distance from the first virtual object as the second virtual object.

In an example embodiment, when the second virtual object is a virtual object controlled by another user, according to different skill types, the second virtual object may belong to the same camp with the first virtual object, or may belong to an opposing camp with the first virtual object. For example, if a skill of the first virtual object is an attack-type skill, the second virtual object and the first virtual object may belong to the opposing camps, and the first virtual object performs an attack operation on the second virtual object; if the skill of the first virtual object is a treatment-type skill, the second virtual object may belong to the same camp with the first virtual object, and the first virtual object performs a treatment operation on the second virtual object.

The embodiment of the disclosure is applicable to a battle scene. The virtual scene of the virtual scene interface includes a first virtual object and a second virtual object. If other virtual objects belong to the same camp with the first virtual object, the user may control the first virtual object to perform a treatment operation to treat the other virtual objects; and if the other virtual objects belong to the opposing camps with the first virtual object, the user may control the first virtual object to perform an attack operation to attack the other virtual objects.

For example, when the terminal controls the first virtual object to perform the skill casting operation to attack the second virtual object, the virtual scene interface changes as shown in FIG. 5 to FIG. 12.

Figure 5:
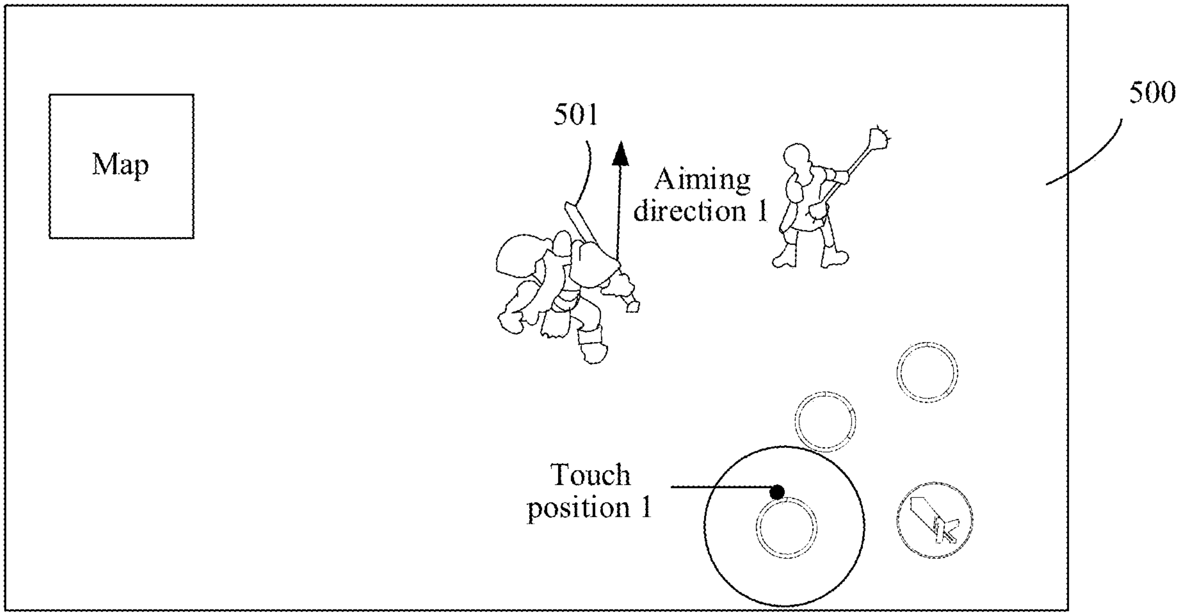
FIG. 5 is a schematic diagram of another virtual scene interface according to an embodiment of the disclosure.

Referring to a virtual scene interface 500 shown in FIG. 5, after the user performs a trigger operation on a skill casting button, a circular touch region is displayed in the virtual scene interface 500, and a dot displayed in the touch region represents a current touch position 1. In this case, an aiming direction 1 of a first virtual object 501 is displayed in a virtual scene, and the user may preview the current aiming direction 1 through the virtual scene interface 500.

Figure 6:
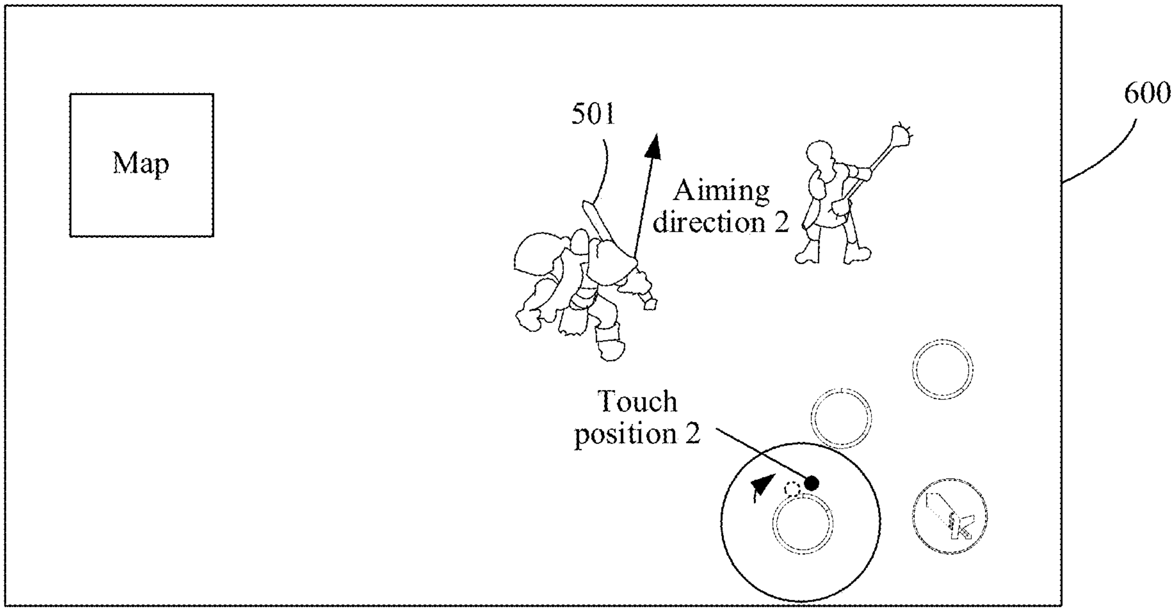
FIG. 6 is a schematic diagram of another virtual scene interface according to an embodiment of the disclosure.
Figure 7:
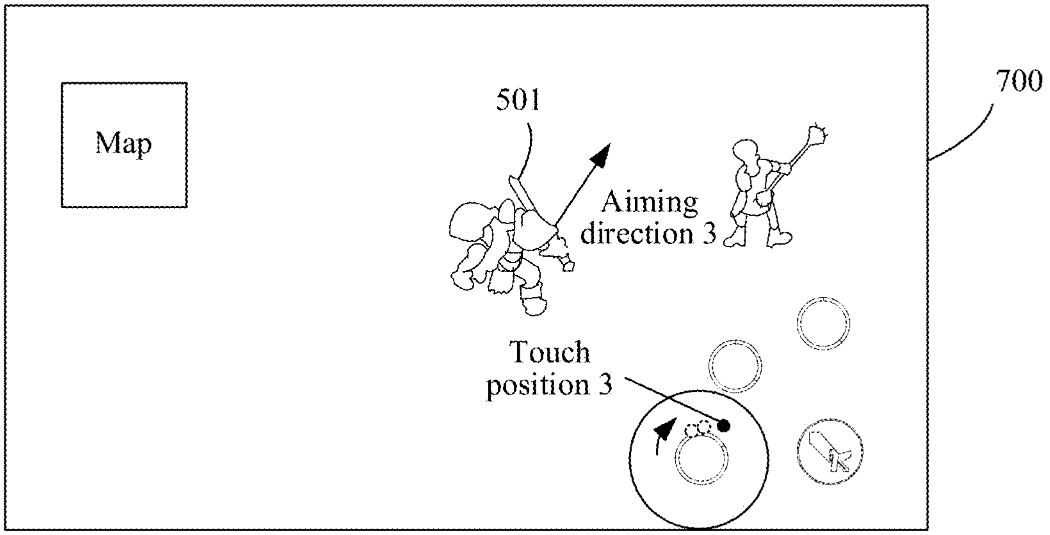
FIG. 7 is a schematic diagram of another virtual scene interface according to an embodiment of the disclosure.
Figure 8:
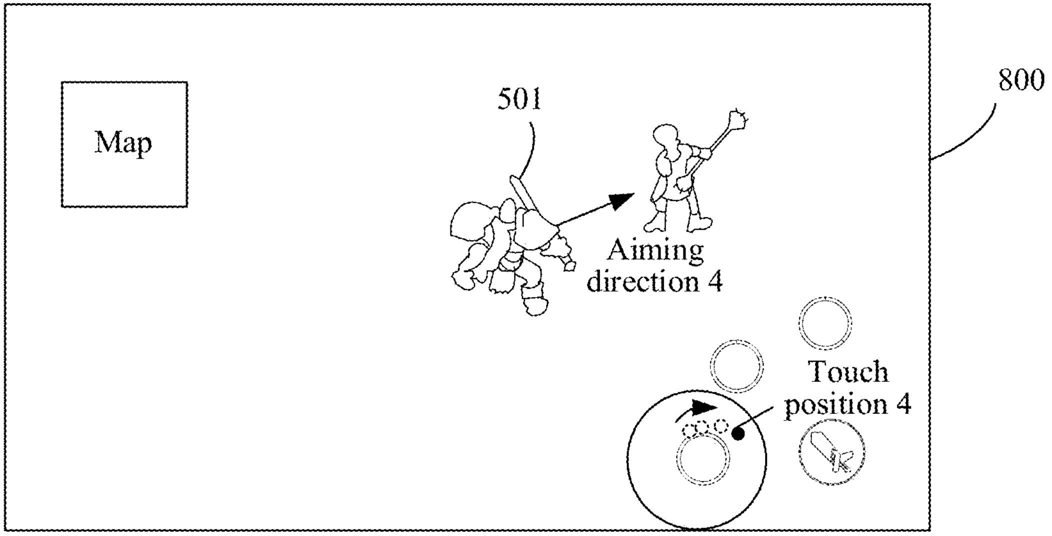
FIG. 8 is a schematic diagram of another virtual scene interface according to an embodiment of the disclosure.

A virtual scene interface 600 shown in FIG. 6 is a virtual scene interface displayed after the finger of the user moves in a direction indicated by an arrow in a touch region and is based on the virtual scene interface 500. After the finger moves, a touch position in the touch region changes from the touch position 1 to a touch position 2, and the aiming direction of the first virtual object 501 also changes accordingly from the aiming direction 1 to an aiming direction 2. A virtual scene interface 700 shown in FIG. 7 is a virtual scene interface displayed after the finger of the user moves again in the touch region and is based on the virtual scene interface 600. A touch position in the touch region of the virtual scene interface 700 in FIG. 7 changes again from the touch position 2 to a touch position 3, and the aiming direction of the first virtual object 501 also changes again from the aiming direction 2 to an aiming direction 3. A virtual scene interface 800 shown in FIG. 8 is a virtual scene interface displayed after the finger of the user moves again in the touch region and is based on the virtual scene interface 700. A touch position in the touch region of the virtual scene interface 800 in FIG. 8 changes again from the touch position 3 to a touch position 4, and the aiming direction of the first virtual object 501 also changes again from the aiming direction 3 to an aiming direction 4.

Figure 9:
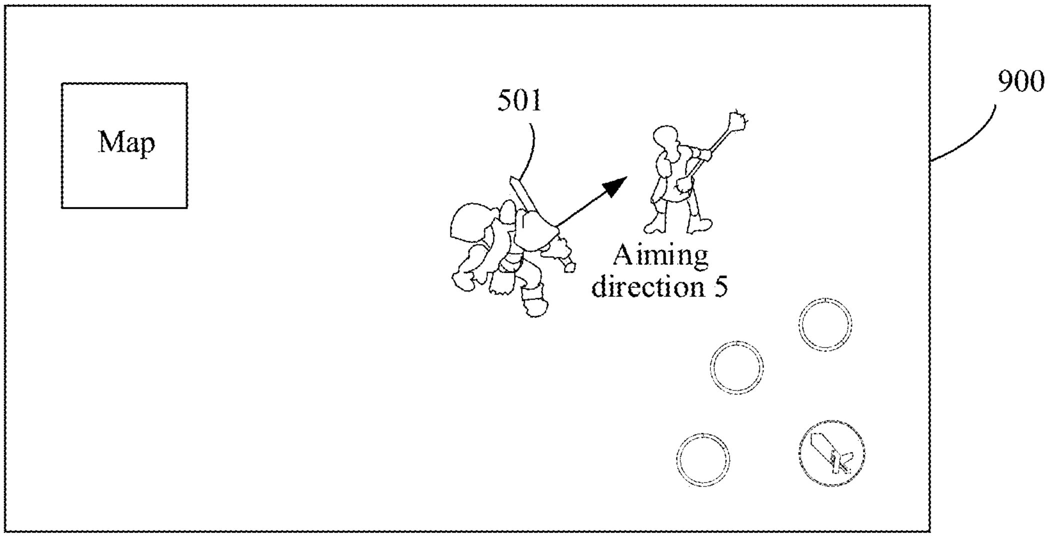
FIG. 9 is a schematic diagram of another virtual scene interface according to an embodiment of the disclosure.

A virtual scene interface 900 shown in FIG. 9 is a virtual scene interface in which the finger of the user lifts and leaves the touch region and is based on the virtual scene interface 800. In this case, the touch region is no longer displayed in the virtual scene interface 900, and the terminal determines a final aiming direction 5 of the first virtual object 501 according to a determined target touch position.

Figure 10:
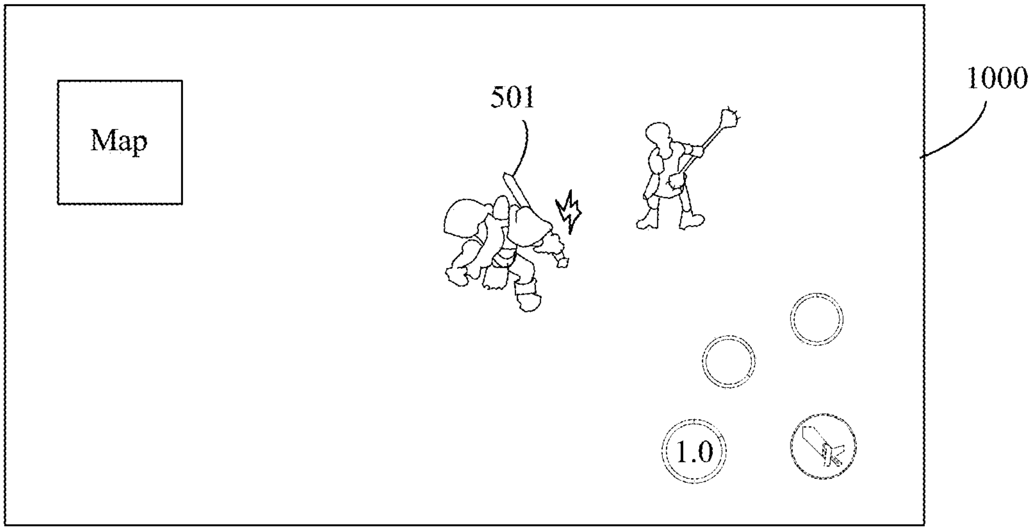
FIG. 10 is a schematic diagram of another virtual scene interface according to an embodiment of the disclosure.
Figure 11:
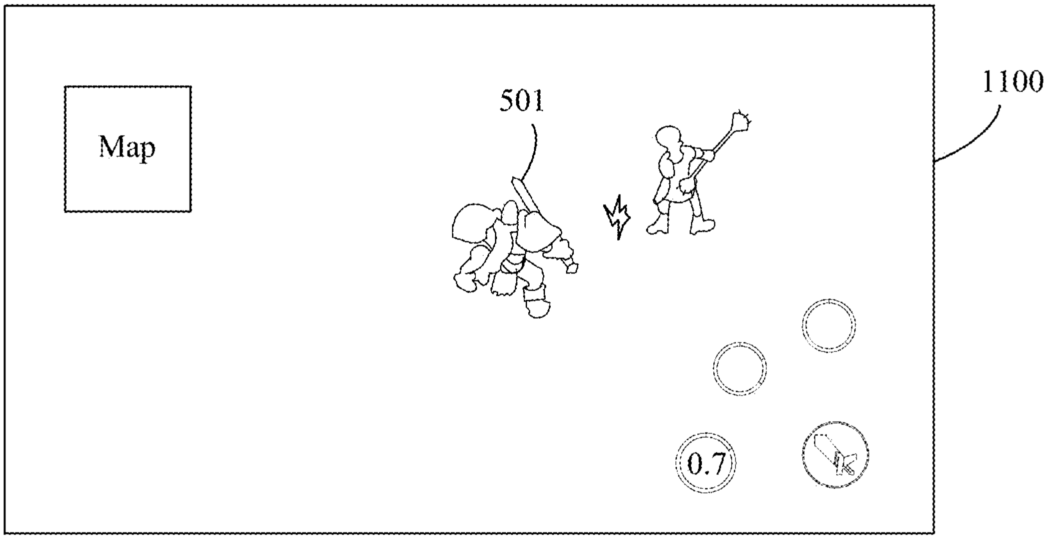
FIG. 11 is a schematic diagram of another virtual scene interface according to an embodiment of the disclosure.
Figure 12:
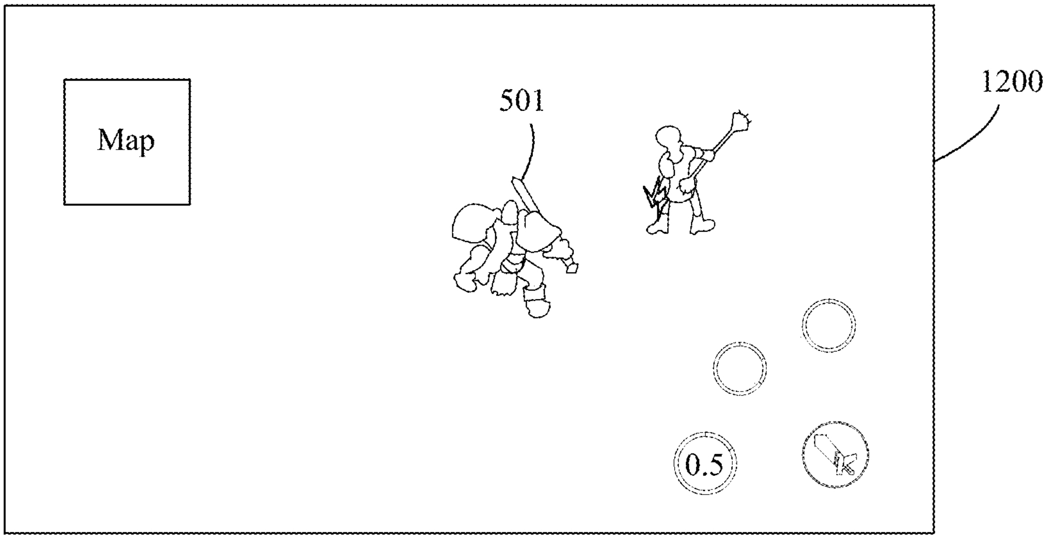
FIG. 12 is a schematic diagram of another virtual scene interface according to an embodiment of the disclosure.

A virtual scene interface 1000 shown in FIG. 10 is a virtual scene interface in which the first virtual object 501 starts to cast a skill according to the aiming direction 5 and is based on the virtual scene interface 900. In this case, a preset duration is displayed in a skill casting button, and the preset duration represents a skill cooling duration. Within the preset duration, the user cannot trigger the skill casting button again until the duration is reduced to 0. A virtual scene interface 1100 shown in FIG. 11 is a virtual scene interface in which the first virtual object 501 has cast a corresponding skill and is based on the virtual scene interface 1000. In this case, the duration displayed in the skill casting button is reduced. A virtual scene interface 1200 shown in FIG. 12 is a virtual scene interface in which the skill cast by the first virtual object 501 has attacked the second virtual object and is based on the virtual scene interface 1100. In this case, the duration displayed on an upper layer of the skill casting button is reduced again.

In addition, all the foregoing embodiments are described by using an example in which the target touch position falls within the second touch subregion. In an example embodiment, if the touch point still falls within the first touch subregion from a moment at which the user presses the finger to a moment at which the user lifts the finger, that is, at least two touch positions each fall within the first touch subregion, the terminal determines a second aiming direction according to a preset rule; and controls, according to the second aiming direction, the first virtual object to perform a skill casting operation. The preset rule may be a rule that is preset, and the user may learn about the preset rule according to a related description of the skill, to determine whether to control, according to the preset rule, the first virtual object to cast the skill or to control, by manually adjusting the aiming direction, the first virtual object to cast the skill.

In an example embodiment, if the preset rule is that the skill is cast on a virtual object that has a distance less than a second preset distance, the terminal determines a position of a third virtual object that has a distance from the first virtual object less than the second preset distance; and determines a second aiming direction according to a position of the first virtual object and the position of the third virtual object, and performs the skill casting operation according to the second aiming direction, to cast the skill on the third virtual object. The first preset distance may be a longest distance that the skill corresponding to the skill casting button may cast.

In an example embodiment, if there are a plurality of virtual objects other than the first virtual object within a range in which the distance from the first virtual object is less than the first preset distance, any one virtual object may be selected from the plurality of virtual objects as the third virtual object, or a virtual object with minimum health points may be selected from the plurality of virtual objects as the third virtual object.

Figure 13:
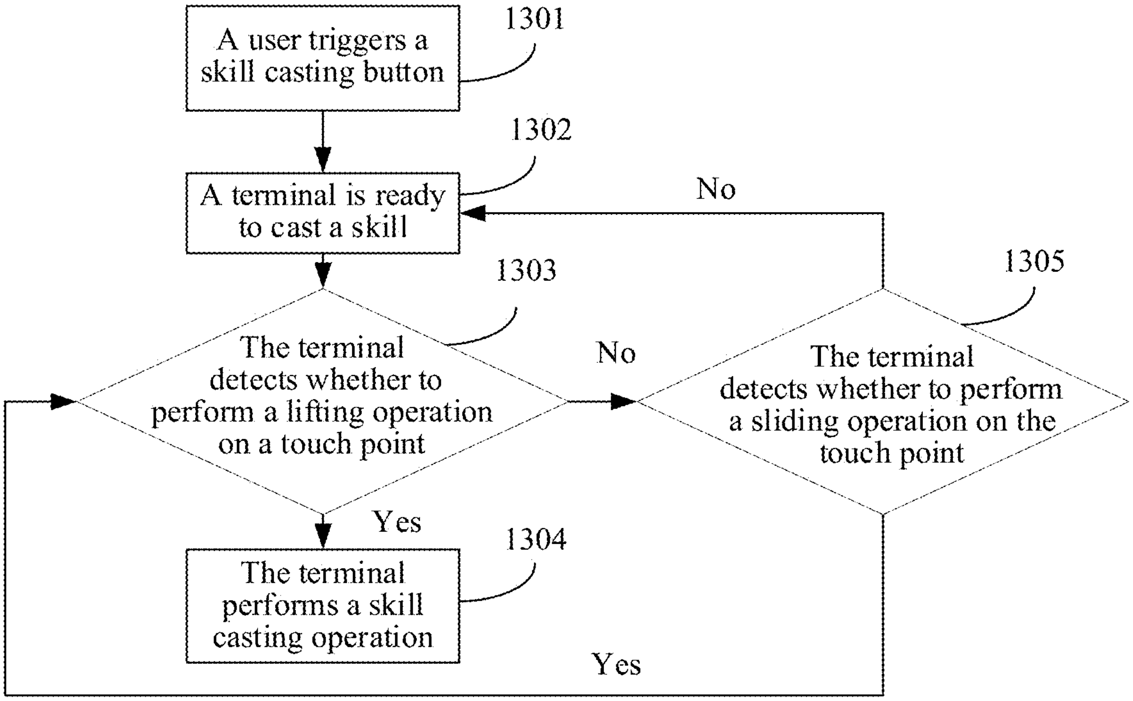
FIG. 13 is a flowchart of controlling a virtual object to cast a skill according to an embodiment of the disclosure.

FIG. 13 is a flowchart of casting a skill according to an embodiment of the disclosure. Referring to FIG. 13, the procedure of casting the skill includes the following operations:

1301. A user triggers a skill casting button, and a terminal displays a touch region, and detects a press operation on a touch point.

1302. The terminal is ready to cast a skill.

1303. The terminal detects whether the user performs a lifting operation (e.g., finger lifting operation) on the touch point. If yes, operation 1304 is performed; and if not, operation 1305 is performed.

1304. Determine a target touch position according to determined at least two touch positions, determine a first aiming direction indicated by the target touch position, and perform a skill casting operation.

1305. The terminal determines whether the user performs a sliding operation on the touch point. If yes, operation 1303 is performed; and if not, operation 1302 is performed.

The embodiment of the disclosure is described only by using a touch region corresponding to a skill casting button of a first virtual object as an example. In another embodiment, for touch regions of other skill casting buttons of the first virtual object, a manner similar to that of the foregoing embodiments may be used to control the first virtual object to perform the skill casting operation.

The embodiment of the disclosure is described only by using an example in which an execution body is a terminal. In another embodiment, operation 204 and operation 205 may be performed by a server connected to the terminal. That is, the terminal determines, in response to the touch operation on the touch region, at least two touch positions through which the touch operation passes, and sends the at least two touch positions to the server. The server determines a target touch position of the touch operation according to the at least two touch positions, determines, according to the target touch position, a first aiming direction indicated by the target touch position, and sends the first aiming direction to the terminal. The terminal controls, according to the first aiming direction, the first virtual object to perform a skill casting operation.

Figure 14:
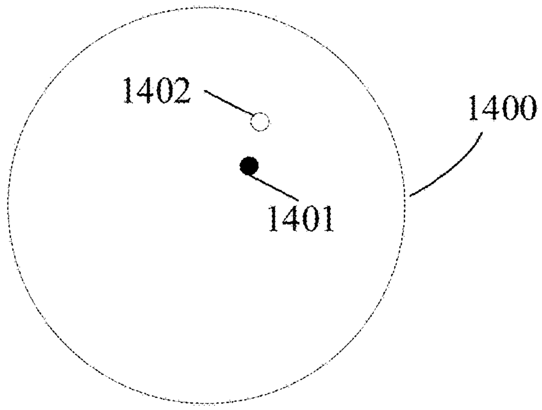
FIG. 14 is a schematic diagram of another touch region according to an embodiment of the disclosure.

In the related art, referring to a schematic diagram of a touch region shown in FIG. 14, a solid dot in the touch region 1400 represents an end touch position 1401 intended by the user, and a hollow dot represents an actual end touch position 1402. It can be learned from FIG. 14 that the end touch position 1401 intended by the user is different from the actual end touch position 1402. If an aiming direction is determined directly according to the actual end touch position 1402, the determined aiming direction is significantly different from the aiming direction intended by the user, resulting in failure to achieve an effect intended by the user.

Figure 15:
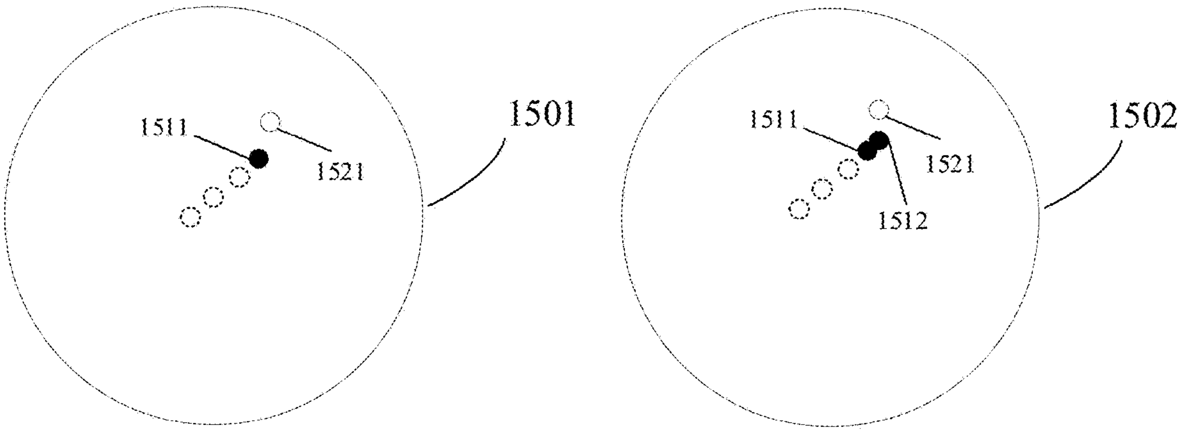
FIG. 15 is a schematic diagram of another touch region according to an embodiment of the disclosure.

Referring to a schematic diagram of a touch region shown in FIG. 15, a trajectory shown in the touch region 1501 is a trajectory generated by the touch operation, a solid dot in the touch region 1502 represents an end touch position 1511 intended by the user, and a hollow dot represents an actual end touch position 1521. By using the method provided in the embodiments of the disclosure, a target touch position 1512 is determined. It can be learned from FIG. 15 that although the end touch position 1511 intended by the user is significantly different from the actual end touch position 1521, the determined target touch position 1512 is similar to the end touch position 1511 intended by the user, and an aiming direction determined according to the target touch position is also similar to an aiming direction intended by the user, thereby achieving an effect intended by the user.

In the method provided in the embodiments of the disclosure, an aiming direction is no longer determined according to only a last touch position of a touch operation in a touch region, but at least two touch positions through which the touch operation passes are determined, and a target touch position determined according to the at least two touch positions is comprehensively considered. Therefore, it is prevented that an aiming direction is determined based on the last touch position generated due to a misoperation of a user, which is inconsistent with a touch position intended by the user. If the obtained target touch position reflects the touch position intended by the user, an aiming direction indicated by the target touch position better meets the intention of the user, thereby improving the accuracy of the aiming direction. Subsequently, a first virtual object is controlled, according to the determined aiming direction, to perform a skill casting operation, so that more accurate control of the skill casting operation of the first virtual object is also achieved.

In addition, in this embodiment of the disclosure, the touch region is divided into a first touch subregion and a second touch subregion, so that the user not only may quickly perform the skill casting operation, but also may manually determine an aiming direction and then perform the skill casting operation, and the user may flexibly make a choice according to the skill cast by the first virtual object in the virtual scene, thereby improving the flexibility of user operation.

In addition, in this embodiment of the disclosure, a touch identifier is assigned to the touch point, and the at least two touch positions that match the touch identifier are determined, to ensure that the determined at least two touch positions are touch positions of the same touch operation, thereby avoiding the interference of touch operations of other fingers in the virtual scene interface, and improving the operation accuracy.

Figure 16:
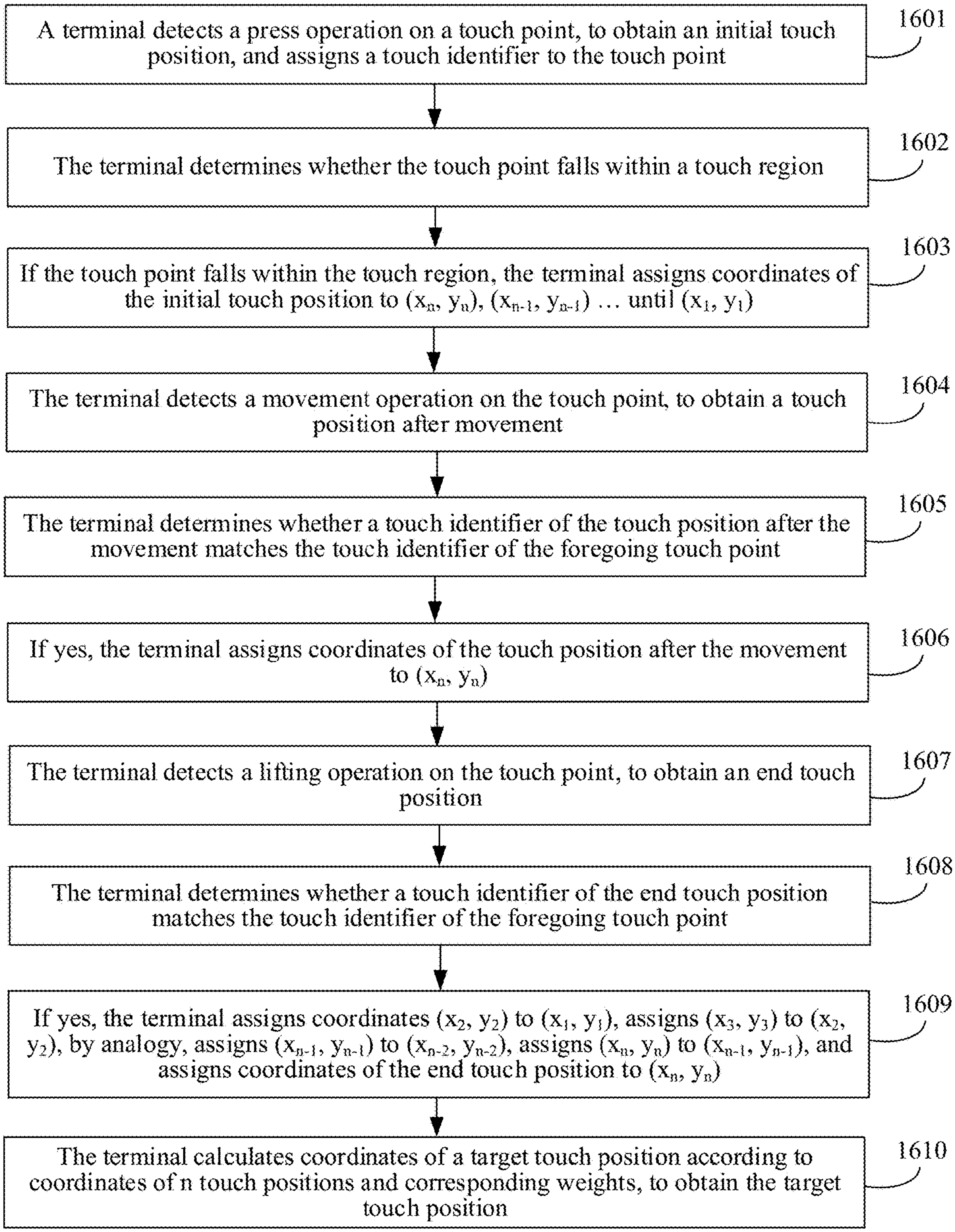
FIG. 16 is a flowchart of determining a target touch position according to an embodiment of the disclosure.

FIG. 16 is a flowchart of determining a target touch position according to an embodiment of the disclosure. The procedure includes the following operations 1601-1610:

1601. A terminal detects a press operation on a touch point, to obtain an initial touch position, and assigns a touch identifier to the touch point.

1602. The terminal determines whether the touch point falls within a touch region.

1603. If the touch point falls within the touch region, the terminal assigns coordinates of the initial touch position to $(x_n, y_n)$, $(x_{n-1}, y_{n-1})$ . . . until $(x_1, y_1)$. $(x_n, y_n)$ may correspond to the most recently received (or last received) touch position. n represents a quantity of touch positions that needs to be determined, n being a positive integer. If the touch point does not fall within the touch region, this procedure ends.

1604. The terminal detects a movement operation on the touch point, to obtain a touch position after movement.

1605. The terminal determines whether a touch identifier of the touch position after the movement matches the touch identifier of the foregoing touch point.

1606. If yes, the terminal assigns coordinates of the touch position after the movement to $(x_n, y_n)$. If not, this procedure ends.

When the user moves the touch point again, operation 1604 is repeatedly performed, previous coordinates $(x_2, y_2)$ is now assigned as $(x_1, y_1)$, previous coordinates $(x_3, y_3)$ is now assigned as $(x_2, y_2)$, by analogy, previous coordinates $(x_{n-1}, y_{n-1})$ is now assigned as $(x_{n-2}, y_{n-2})$, previous coordinates $(x_n, y_n)$ is now assigned as $(x_{n-1}, y_{n-1})$, and coordinates of a touch position after the movement again are assigned to $(x_n, y_n)$.

1607. The terminal detects a lifting operation on the touch point, to obtain an end touch position.

1608. The terminal determines whether a touch identifier of the end touch position matches the touch identifier of the foregoing touch point.

1609. If yes in 1608, the terminal assigns $(x_2, y_2)$ to $(x_1, y_1)$, assigns $(x_3, y_3)$ to $(x_2, y_2)$, by analogy, assigns $(x_{n-1}, y_{n-1})$ to $(x_{n-2}, y_{n-2})$, assigns $(x_n, y_n)$ to $(x_{n-1}, y_{n-1})$, and assigns coordinates of the end touch position to $(x_n, y_n)$.

1610. The terminal calculates coordinates of a target touch position according to coordinates of n touch positions and corresponding weights, to obtain the target touch position. n is a positive integer greater than 1.

For example, n is 3. That is, three touch positions need to be determined, to obtain coordinates $(x_1, y_1)$, $(x_2, y_2)$ and $(x_3, y_3)$ of the three touch positions. In the process of determining coordinates of the touch position, it is assumed that a total of 10 touch positions are obtained, after an initial touch position is obtained, coordinates of the initial touch position are assigned to $(x_1, y_1)$, $(x_2, y_2)$ and $(x_3, y_3)$; after a second touch position is obtained, coordinates of the second touch position are assigned to $(x_3, y_3)$, and after a third touch position is obtained, $(x_3, y_3)$ (previously the coordinates of the second touch position) is assigned to $(x_2, y_2)$, and coordinates of the third touch position are assigned to $(x_3, y_3)$; and after coordinates of a fourth touch position are obtained, $(x_2, y_2)$ (previously the coordinates of the second touch position) is assigned to $(x_1, y_1)$, and $(x_3, y_3)$ (previously the coordinates of the third touch position) is assigned to $(x_2, y_2)$, and the coordinates of the fourth touch position are assigned to $(x_3, y_3)$, and the process is repeated until an end touch position is obtained. When the end touch position is obtained, $(x_2, y_2)$ (previously coordinates of an eighth touch position) is assigned to $(x_1, y_1)$, $(x_3, y_3)$ (previously coordinates of a ninth touch position) is assigned to $(x_2, y_2)$, and coordinates of the end touch position (that is, a tenth touch position) are assigned to $(x_3, y_3)$, to obtain coordinates of last three touch positions.

Figure 17:
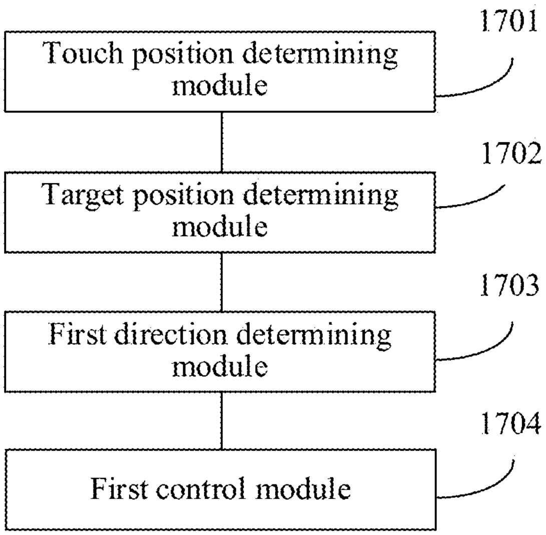
FIG. 17 is a schematic structural diagram of a virtual object control apparatus according to an embodiment of the disclosure.

FIG. 17 is a schematic structural diagram of a virtual object control apparatus according to an embodiment of the disclosure. Referring to FIG. 17, the apparatus includes:

a touch position determining module 1701, configured to determine, in response to a touch operation on a touch region, at least two touch positions through which the touch operation passes, the at least two touch positions being selected from a preset quantity of touch positions through which the touch operation lastly passes before the touch operation is ended;

a target position determining module 1702, configured to combine the at least two touch positions according to a preset policy, and determine a target touch position of the touch operation;

a first direction determining module 1703, configured to determine a first aiming direction indicated by the target touch position; and a first control module 1704, configured to control, according to the first aiming direction, a first virtual object to perform a skill casting operation.

In the apparatus provided in the embodiments of the disclosure, an aiming direction is no longer determined according to only a last touch position of a touch operation in a touch region, but at least two touch positions through which the touch operation passes are determined, and a target touch position determined according to the at least two touch positions is comprehensively considered, thereby avoiding a case in which an aiming direction is determined based on the last touch position generated due to a misoperation of a user, which is inconsistent with a touch position intended by the user. If the obtained target touch position reflects the touch position intended by the user, an aiming direction indicated by the target touch position better meets a requirement of the user, thereby improving the accuracy of the aiming direction. Subsequently, a first virtual object is controlled, according to the determined aiming direction, to perform a skill casting operation, so that more accurate control of the skill casting operation of the first virtual object is also achieved.

Figure 18:
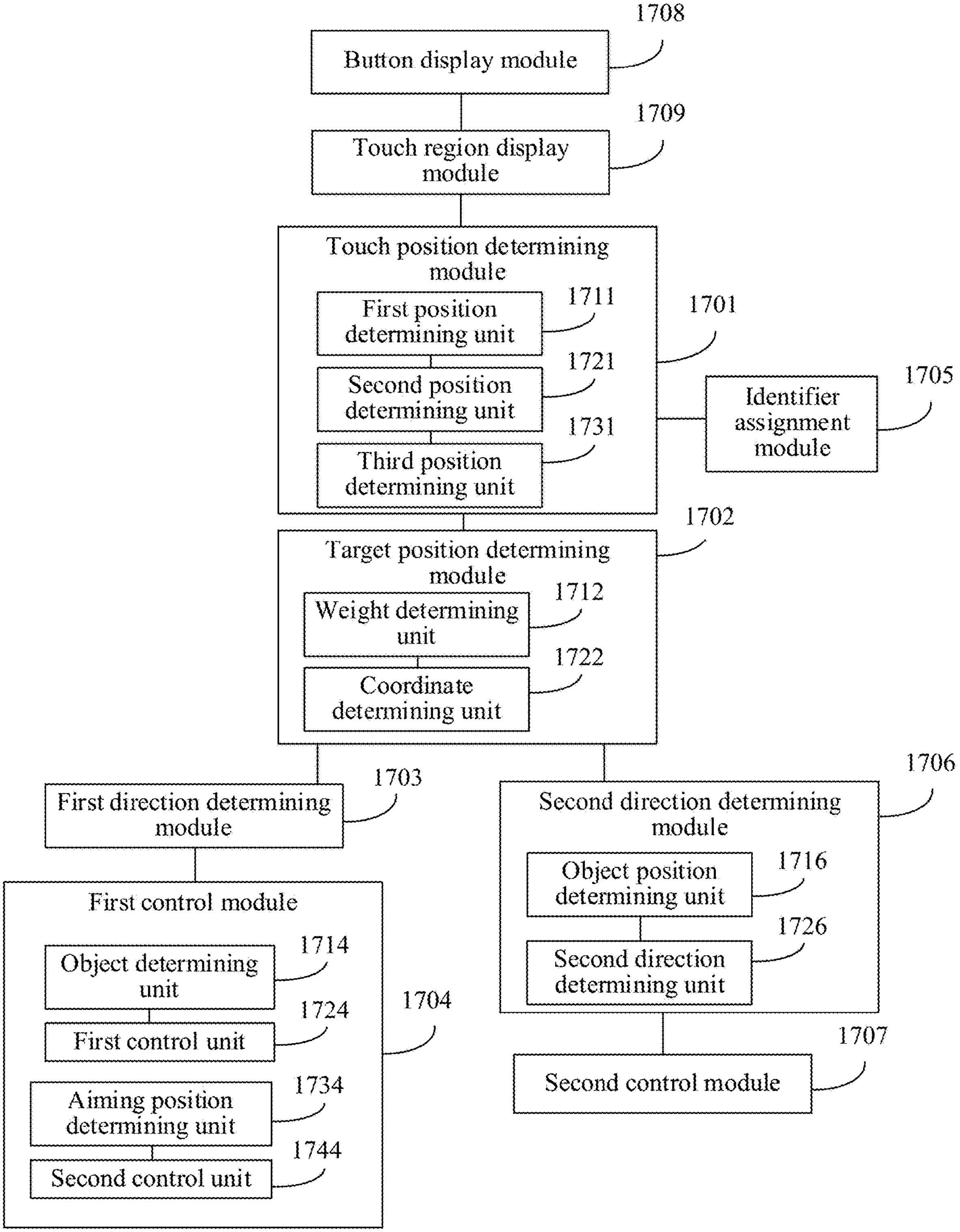
FIG. 18 is a schematic structural diagram of another virtual object control apparatus according to an embodiment of the disclosure.

In an example embodiment, referring to FIG. 18, the target position determining module 1702 includes:

a weight determining unit 1712, configured to determine weights of the at least two touch positions according to an arrangement order (or an input order) of the at least two touch positions; and a coordinate determining unit 1722, configured to perform weighted combination on coordinates of the at least two touch positions according to the weights of the at least two touch positions, to obtain coordinates of the target touch position.

In another example embodiment, referring to FIG. 18, the coordinates of the target touch position include a horizontal coordinate and a vertical coordinate. The coordinate determining unit 1722 is configured to:

perform weighted summation on horizontal coordinates of the at least two touch positions according to the weights of the at least two touch positions, to obtain a horizontal coordinate of the target touch position; and perform weighted summation on vertical coordinates of the at least two touch positions according to the weights of the at least two touch positions, to obtain a vertical coordinate of the target touch position.

In another example embodiment, referring to FIG. 18, the touch position determining module 1701 includes:

a first position determining unit 1711, configured to determine, in response to a press operation corresponding to a first touch point in the touch region, an initial touch position corresponding to the press operation;

a second position determining unit 1721, configured to determine at least one touch position during a sliding operation from the first touch point in the touch region; and a third position determining unit 1731, configured to determine, in response to a lifting operation (e.g., finger listing operation) corresponding to the touch point in the touch region, an end touch position corresponding to the lifting operation.

In another example embodiment, referring to FIG. 18, the apparatus further includes:

an identifier assignment module 1705, configured to assign a touch identifier to the touch point in response to the press operation corresponding to the touch point in the touch region; and a second position determining unit 1721, configured to determine at least two touch positions that are detected in the touch region and match the touch identifier.

In another example embodiment, referring to FIG. 18, the first control module 1704 includes:

an object determining unit 1714, configured to determine a second virtual object that has a shortest distance from the first virtual object in the first aiming direction; and a first control unit 1724, configured to control the first virtual object to perform the skill casting operation on the second virtual object.

In another example embodiment, referring to FIG. 18, the first control module 1704 includes:

an aiming position determining unit 1734, configured to determine an aiming position in the first aiming direction according to the first aiming direction and a first preset distance, a distance between the aiming position and the first virtual object being the first preset distance; and a second control unit 1744, configured to control the first virtual object to perform the skill casting operation on the aiming position.

In another example embodiment, referring to FIG. 18, the touch region includes a first touch subregion and a second touch subregion, the second touch subregion being outside the first touch subregion.

The target position determining module 1702 is configured to determine the target touch position of the touch operation according to the at least two touch positions in a case that the end touch position falls within the second touch subregion.

In another example embodiment, referring to FIG. 18, the apparatus further includes:

a second direction determining module 1706, configured to determine a second aiming direction according to a preset rule in a case that the at least two touch positions all fall within the first touch subregion; and a second control module 1707, configured to control, according to the second aiming direction, a first virtual object to perform a skill casting operation.

In another example embodiment, referring to FIG. 18, the second direction determining module 1706 includes:

an object position determining unit 1716, configured to determine a position of a third virtual object that has a distance from the first virtual object less than a second preset distance; and a second direction determining unit 1726, configured to determine the second aiming direction according to a position of the first virtual object and the position of the third virtual object.

In another example embodiment, referring to FIG. 18, the apparatus further includes:

a button display module 1708, configured to display a skill casting button of the first virtual object through a virtual scene interface corresponding to the first virtual object; and a touch region display module 1709, configured to display the touch region through the virtual scene interface in response to a trigger operation on the skill casting button.

All of the above-mentioned technical solutions may be combined randomly or modified to provide other example embodiments of the disclosure, and details are not described herein again.

When the virtual object control apparatus provided in the foregoing embodiments controls the virtual object, only division of the foregoing functional modules is used as an example for description. In actual application, the functions may be allocated to and completed by different functional modules according to requirements. That is, an internal structure of the terminal is divided into different functional modules, to complete all or some of the functions described above. In addition, the embodiments of the virtual object control apparatus and the virtual object control method that are provided in the foregoing embodiments belong to the same concept. For a specific implementation process, refer to the method embodiment, and details are not described herein again.

Figure 19:
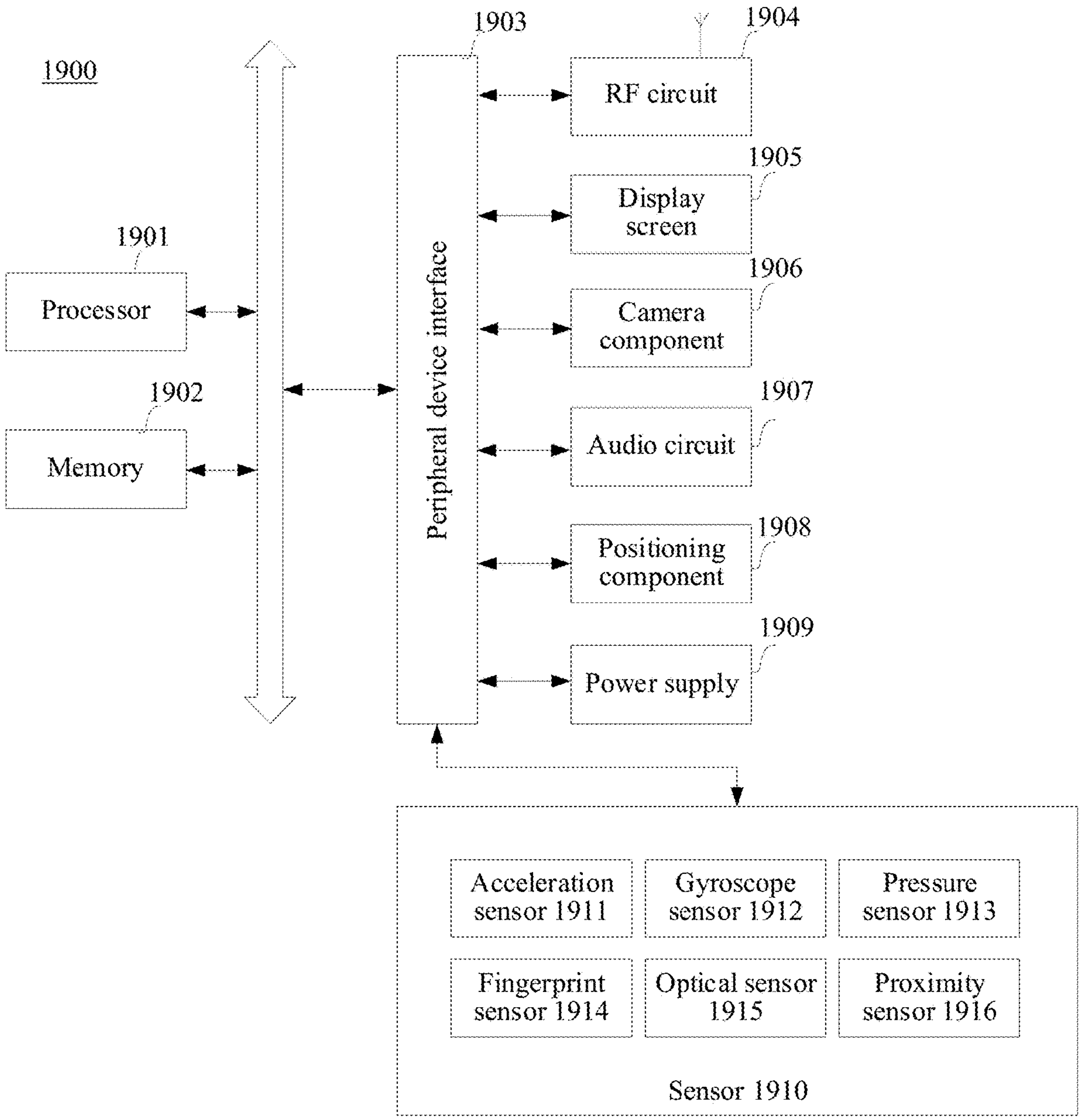
FIG. 19 is a schematic structural diagram of a terminal according to an embodiment of the disclosure.

FIG. 19 is a schematic structural diagram of a terminal 1900 according to an exemplary embodiment of the disclosure. The terminal 1900 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1900 may also be referred to other names such as user equipment, a portable terminal, a laptop terminal, or a desktop terminal.

Generally, the terminal 1900 includes a processor 1901 and a memory 1902.

The processor 1901 may include one or more processing cores, for example, a 4-core processor or an 8-core processor. The processor 1901 may be implemented by using at least one hardware form of a digital signal processor (DSP), a field-programmable gate array (FPGA), and a programmable logic array (PLA). The processor 1901 may alternatively include a main processor and a coprocessor. The main processor is a processor configured to process data in an awake state, and is also referred to as a central processing unit (CPU), and the coprocessor is a low-power processor configured to process data in a standby state. In some embodiments, the processor 1901 may be integrated with a graphics processing unit (GPU). The GPU is configured to render and draw content that needs to be displayed on a display screen. In some embodiments, the processor 1901 may further include an artificial intelligence (AI) processor. The AI processor is configured to process computing operations related to machine learning.

The memory 1902 may include one or more computer-readable storage media. The computer-readable storage media may be non-transient. The memory 1902 may further include a high-speed random access memory (RAM) and a non-volatile memory, for example, one or more disk storage devices or flash memory devices. In some embodiments, a non-transitory computer-readable storage medium in the memory 1902 is configured to store at least one instruction, the at least one instruction being configured to be executed by the processor 1901 to implement the virtual object control method provided in the method embodiments of the disclosure.

In some embodiments, the terminal 1900 may include a peripheral device interface 1903 and at least one peripheral device. The processor 1901, the memory 1902, and the peripheral device interface 1903 may be connected through a bus or a signal line. Each peripheral device may be connected to the peripheral device interface 1903 by using a bus, a signal cable, or a circuit board. Specifically, the peripheral device includes: at least one of a radio frequency (RF) circuit 1904, a display screen 1905, a camera component 1906, an audio circuit 1907, a positioning component 1908, and a power supply 1909.

The peripheral device interface 1903 may be configured to connect at least one peripheral device related to input/output (I/O) to the processor 1901 and the memory 1902. In some embodiments, the processor 1901, the memory 1902, and the peripheral device interface 1903 are integrated on the same chip or circuit board. In some other embodiments, any one or two of the processor 1901, the memory 1902, and the peripheral device interface 1903 may be implemented on a separate chip or circuit board. This is not limited in this embodiment.

In some embodiments, the terminal 1900 may further include one or more sensors 1910. The one or more sensors 1910 include, but not limited to, an acceleration sensor 1911, a gyroscope sensor 1912, a pressure sensor 1919, a fingerprint sensor 1914, an optical sensor 1915, and a proximity sensor 1916.

A person skilled in the art would understand that the structure shown in FIG. 19 does not constitute a limitation on the terminal 1900, and the terminal may include more components or fewer components than those shown in the figure, or some components may be combined, or a different component deployment may be used.

Figure 20:
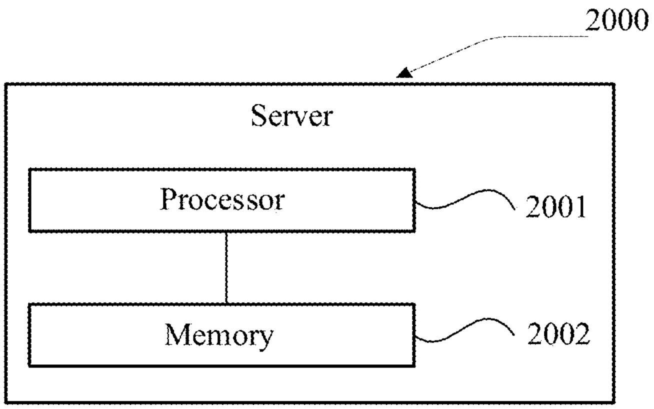
FIG. 20 is a schematic structural diagram of a server according to an embodiment of the disclosure.

FIG. 20 is a schematic structural diagram of a server according to an embodiment of the disclosure. The server 2000 may vary greatly due to different configurations or performance, and may include one or more CPUs 2001 and one or more memories 2002. The memory 2002 stores at least one instruction, the at least one instruction being loaded and executed by the processor 2001 to implement the methods provided in the foregoing method embodiments. The server may further include components such as a wired or wireless network interface, a keyboard, and an I/O interface, to facilitate I/O. The server may further include another component configured to implement functions of a device, and details are not described herein again.

The server 2000 may be configured to perform the operations performed by the server in the foregoing virtual object control method.

The embodiments of the disclosure further provide a computer device, including a processor and a memory, the memory storing at least one instruction, the at least one instruction being loaded and executed by the processor to implement the operations performed in the virtual object control method according to the foregoing embodiments.

The embodiments of the disclosure further provide a computer-readable storage medium. The computer-readable storage medium stores at least one instruction, the at least one instruction being loaded and executed by a processor to perform operations performed in the virtual object control method according to the foregoing embodiments.

The embodiments of the disclosure further provide a computer program, storing at least one instruction, the at least one instruction being loaded and executed by a processor to perform operations performed in the virtual object control method according to the foregoing embodiments.

A person of ordinary skill in the art would understand that all or some of the operations of the foregoing embodiments may be implemented by hardware, or may be implemented a program instructing related hardware. The program may be stored in a computer-readable storage medium. The storage medium may be: a ROM, a magnetic disk, or an optical disc.

In the method and apparatus, the computer device, and the storage medium provided in the embodiments of the disclosure, an aiming direction is no longer determined according to only a last touch position of a touch operation in a touch region, but at least two touch positions through which the touch operation passes are determined, and a target touch position determined according to the at least two touch positions is comprehensively considered, thereby avoiding a case in which an aiming direction is determined based on the last touch position generated due to a misoperation of a user, which is inconsistent with a touch position intended by the user. According to an example embodiment, the obtained target touch position reflects the touch position intended by the user, and thus, an aiming direction indicated by the target touch position better meets the intention of the user, thereby improving the accuracy in determining the aiming direction. Subsequently, a first virtual object is controlled, according to the determined aiming direction, to perform a skill casting operation, so that more accurate control of the skill casting operation of the first virtual object is also achieved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the embodiments of the disclosure, but are not intended to limit the embodiments of the disclosure. Any modification, equivalent replacement, or improvement made within the spirit and principle of the embodiments of the disclosure falls within the protection scope of the disclosure.

What is claimed is:

1. A method of controlling a virtual object in an application, performed by a terminal device, the method comprising:

determining, in response to a touch operation by a user on a touch region, at least two touch positions through which the touch operation passes, wherein the touch region and a region where a skill is cast by the virtual object are different regions on the terminal device;

determining a true touch position of the user on the touch region based on a trajectory of the at least two touch positions and an input order of the at least two touch positions;

determining weights of the at least two touch positions according to the input order of the at least two touch positions;

obtaining coordinates of the true touch position based on a combination of coordinates of the at least two touch positions according to the weights of the at least two touch positions;

determining a first direction indicated by the true touch position; and controlling a first virtual object according to the first direction.

2. The method according to claim 1, wherein the controlling the virtual object comprises one of the following:

controlling the first virtual object to perform a skill casting operation in the first direction;

controlling the first virtual object to move a prop object in the first direction;

controlling the first virtual object to aim the prop object in the first direction; or controlling the first virtual object to throw the prop object in the first direction.

3. The method according to claim 1, wherein the obtaining the coordinates of the true touch position comprises:

performing weighted summation on horizontal coordinates of the at least two touch positions according to the weights of the at least two touch positions, to obtain a horizontal coordinate of the true touch position; and performing weighted summation on vertical coordinates of the at least two touch positions according to the weights of the at least two touch positions, to obtain a vertical coordinate of the true touch position.

4. The method according to claim 1, wherein the determining the at least two touch positions comprises:

determining, in response to a press operation corresponding to a first touch point in the touch region, at least one intermediate touch position during a sliding operation from the first touch point in the touch region;

determining, in response to a lifting operation corresponding to a second touch point in the touch region, an end touch position corresponding to the lifting operation; and determining a preset quantity of touch positions from the at least one intermediate touch position and the end touch position.

5. The method according to claim 4, further comprising:

assigning a touch identifier to the first touch point in response to the press operation corresponding to the first touch point in the touch region; and the determining the at least one intermediate touch position comprises:

determining the at least one intermediate touch position that is detected in the touch region and match the touch identifier.

6. The method according to claim 1, wherein the controlling the first virtual object comprises:

determining a second virtual object that has a shortest distance from the first virtual object in the first direction; and controlling the first virtual object to perform a skill casting operation on the second virtual object.

7. The method according to claim 1, wherein the controlling the first virtual object comprises:

determining an aiming position in the first direction according to the first direction and a first preset distance, a distance between the aiming position and the first virtual object being the first preset distance; and controlling the first virtual object to perform a first operation towards the aiming position.

8. The method according to claim 1, wherein the touch region comprises a first touch subregion and a second touch subregion, the second touch subregion being outside the first touch subregion; and the determining the true touch position comprises:

determining the true touch position of the touch operation according to the at least two touch positions based on an end touch position of the touch operation being within the second touch subregion.

9. The method according to claim 8, further comprising:

determining a second direction according to a preset rule based on the at least two touch positions being within the first touch subregion; and controlling, according to the second direction, the first virtual object to perform a skill casting operation.

10. The method according to claim 9, wherein the determining the second direction comprises:

determining a position of a third virtual object that has a distance from the first virtual object less than a second preset distance; and determining the second direction according to a position of the first virtual object and the position of the third virtual object.

11. A virtual object control apparatus, comprising:

at least one memory configured to store computer code; and at least one processor configured to read the computer code and operate as instructed by the computer code, the computer code comprising:

touch position determining code configured to cause the at least one processor to determine, in response to a touch operation by a user on a touch region, at least two touch positions through which the touch operation passes, wherein the touch region and a region where a skill is cast by the virtual object are different regions on the terminal device;

target position determining code configured to cause the at least one processor to determine a true touch position of the touch operation based on a trajectory of the at least two touch positions and an input order of the at least two touch positions, wherein the target position determining code comprises:

weight determining sub-code configured to cause the at least one processor to determine weights of the at least two touch positions according to the input order of the at least two touch positions, and coordinate determining sub-code configured to cause the at least one processor to obtain coordinates of the true touch position based on a combination of coordinates of the at least two touch positions according to the weights of the at least two touch positions;

first direction determining code configured to cause the at least one processor to determine the first direction indicated by the true touch position; and first control code configured to cause the at least one processor to control a first virtual object according to the first direction.

12. The apparatus according to claim 11, wherein the controlling the virtual object comprises one of the following:

controlling the first virtual object to perform a skill casting operation in the first direction;

controlling the first virtual object to move a prop object in the first direction;

controlling the first virtual object to aim the prop object in the first direction; or controlling the first virtual object to throw the prop object in the first direction.

13. The apparatus according to claim 11, wherein the coordinate determining sub-code is configured to cause the at least one processor to:

perform weighted summation on horizontal coordinates of the at least two touch positions according to the weights of the at least two touch positions, to obtain a horizontal coordinate of the true touch position; and perform weighted summation on vertical coordinates of the at least two touch positions according to the weights of the at least two touch positions, to obtain a vertical coordinate of the true touch position.

14. The apparatus according to claim 11, wherein the touch position determining code comprises:

first position determining sub-code configured to cause the at least one processor to determine, in response to a press operation corresponding to a first touch point in the touch region, an initial touch position corresponding to the press operation;

second position determining sub-code configured to cause the at least one processor to determine at least one touch position during a sliding operation from the first touch point in the touch region; and third position determining sub-code configured to cause the at least one processor to determine, in response to a lifting operation corresponding to a second touch point in the touch region, an end touch position corresponding to the lifting operation.

15. The apparatus according to claim 11, wherein the first control code comprises:

object determining sub-code configured to cause the at least one processor to determine a second virtual object that has a shortest distance from the first virtual object in the first direction; and first control sub-code configured to cause the at least one processor to control the first virtual object to perform a skill casting operation on the second virtual object.

16. The apparatus according to claim 11, wherein the first control code comprises:

an aiming position determining unit, configured to determine an aiming position in the first direction according to the first direction and a first preset distance, a distance between the aiming position and the first virtual object being the first preset distance; and a second control unit, configured to control the first virtual object to perform a skill casting operation towards the aiming position.

17. The apparatus according to claim 11, wherein the touch region comprises a first touch subregion and a second touch subregion, the second touch subregion being outside the first touch subregion; and the target position determining code is configured to cause the at least one processor to determine the true touch position of the touch operation according to the at least two touch positions based on an end touch position of the touch operation being within the second touch subregion.

18. A non-transitory computer-readable storage medium, storing at least one instruction executable by at least one processor to perform:

determine, in response to a touch operation by a user on a touch region, at least two touch positions through which the touch operation passes;

determine a true touch position of the user on the touch region based on a trajectory of the at least two touch positions and an input order of the at least two touch positions;

determine weights of the at least two touch positions according to the input order of the at least two touch positions;

obtain coordinates of the true touch position based on a combination of coordinates of the at least two touch positions according to the weights of the at least two touch positions;

determine a first direction indicated by the true touch position; and control a first virtual object according to the first direction.

* * * * *